April 27, 1937.  E. J. SVENSON  2,078,698
MATERIAL WORKING APPARATUS AND HYDRAULIC SYSTEM OF CONTROL THEREFOR
Original Filed Nov. 1, 1933   10 Sheets-Sheet 1
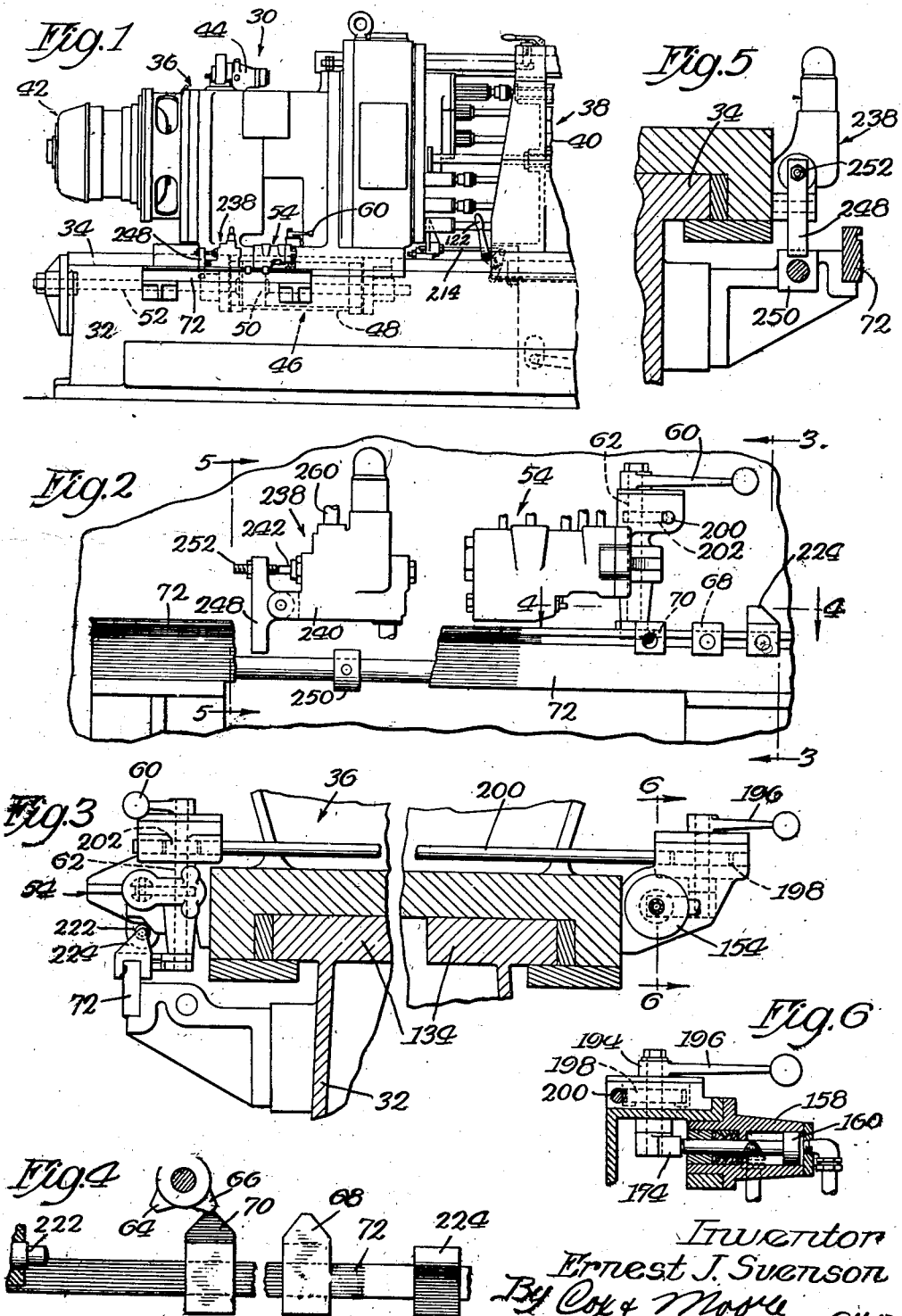
Inventor
Ernest J. Svenson
By Cox & Moore
Attys.

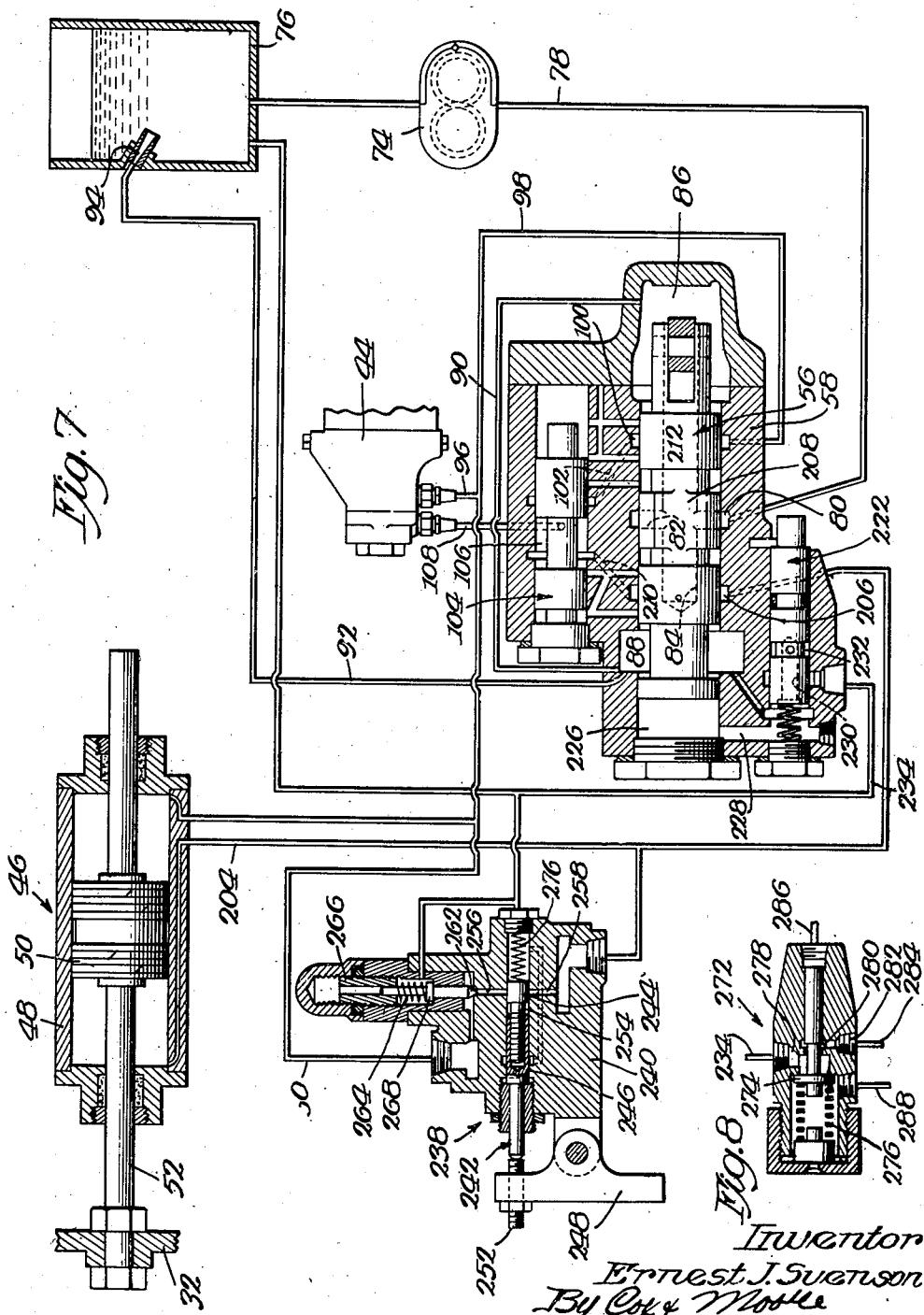

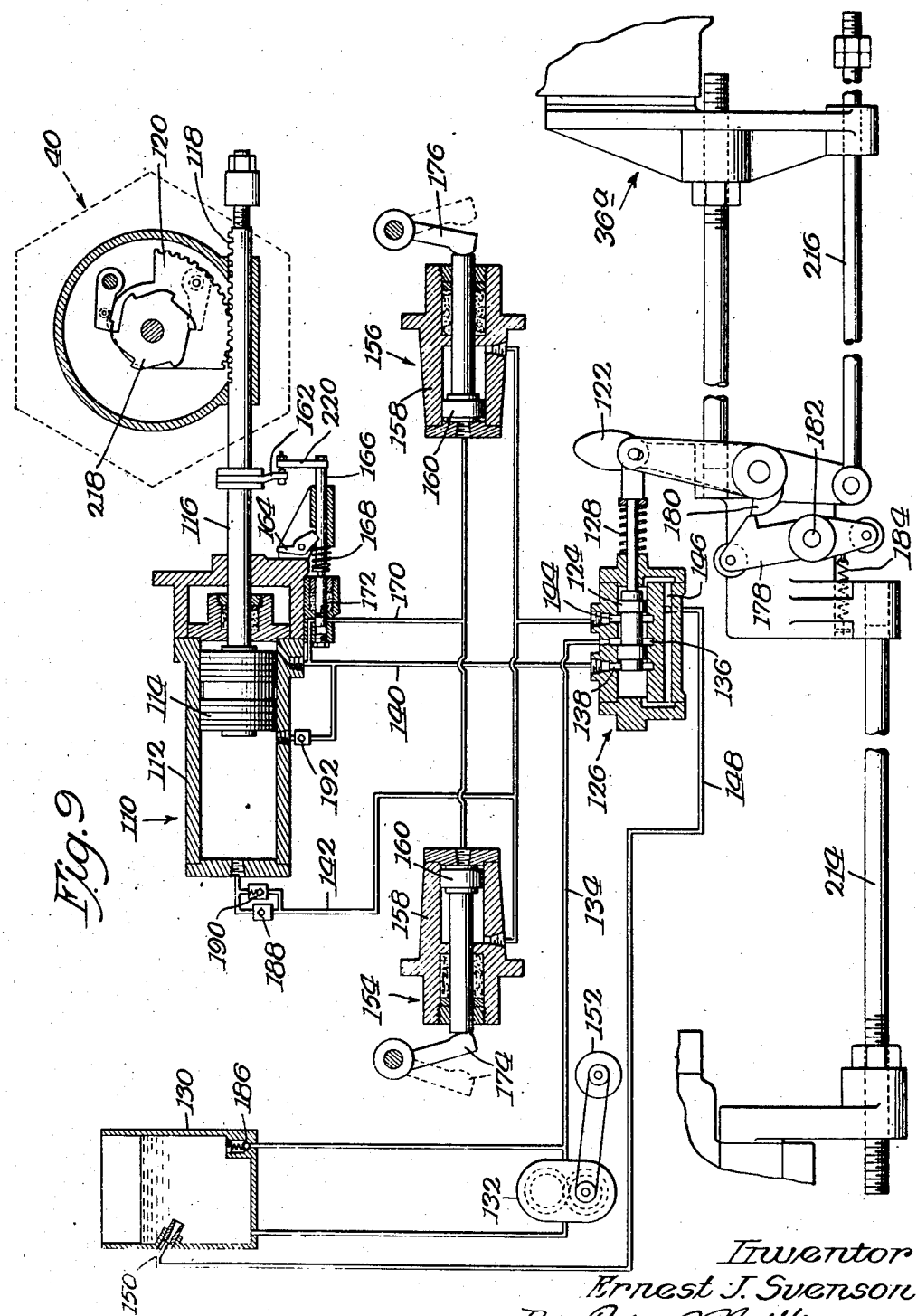

April 27, 1937.  E. J. SVENSON  2,078,698
MATERIAL WORKING APPARATUS AND HYDRAULIC SYSTEM OF CONTROL THEREFOR
Original Filed Nov. 1, 1933   10 Sheets-Sheet 4

Inventor
Ernest J. Svenson
By Cox & Moore
Attys.

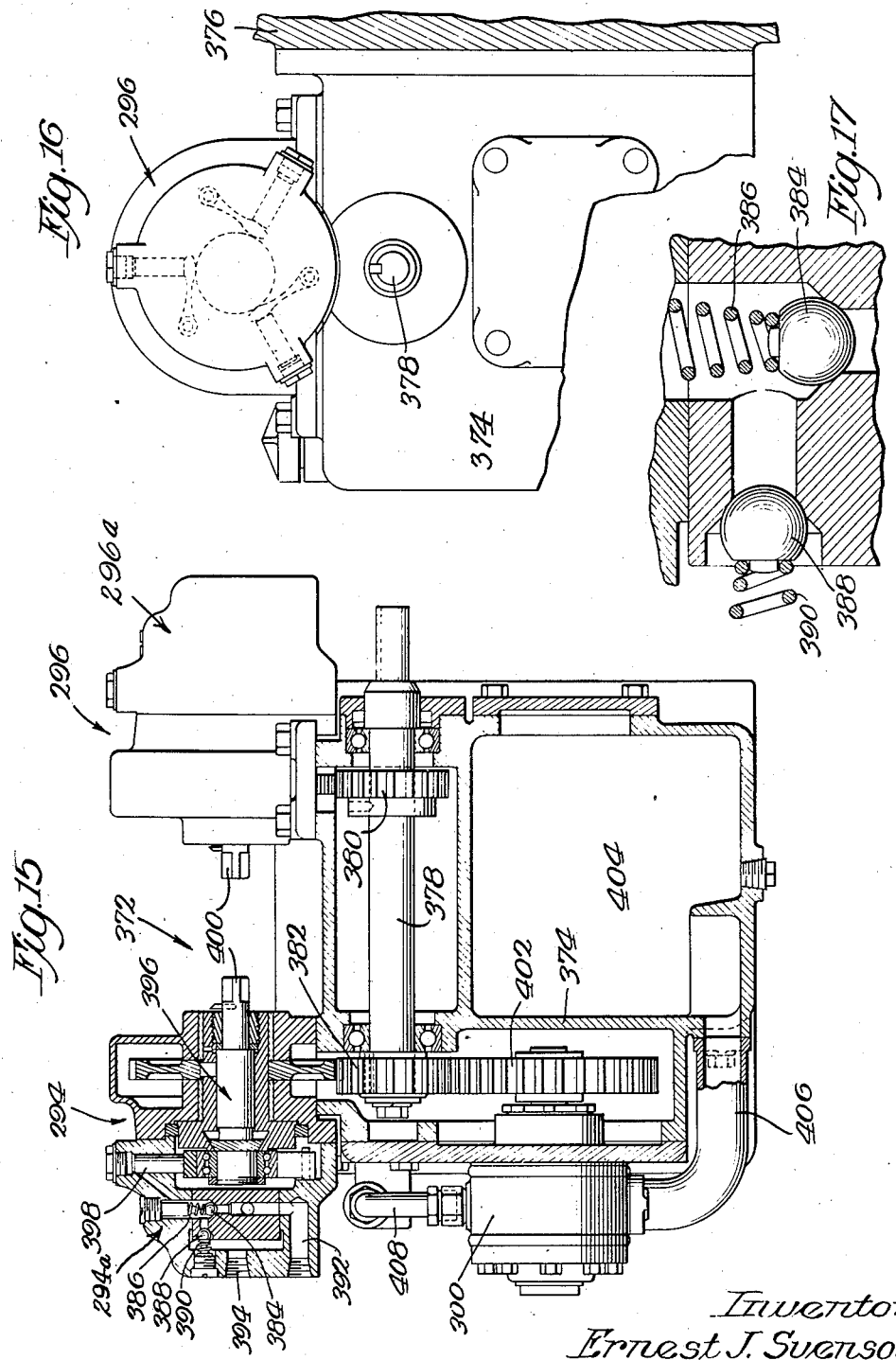

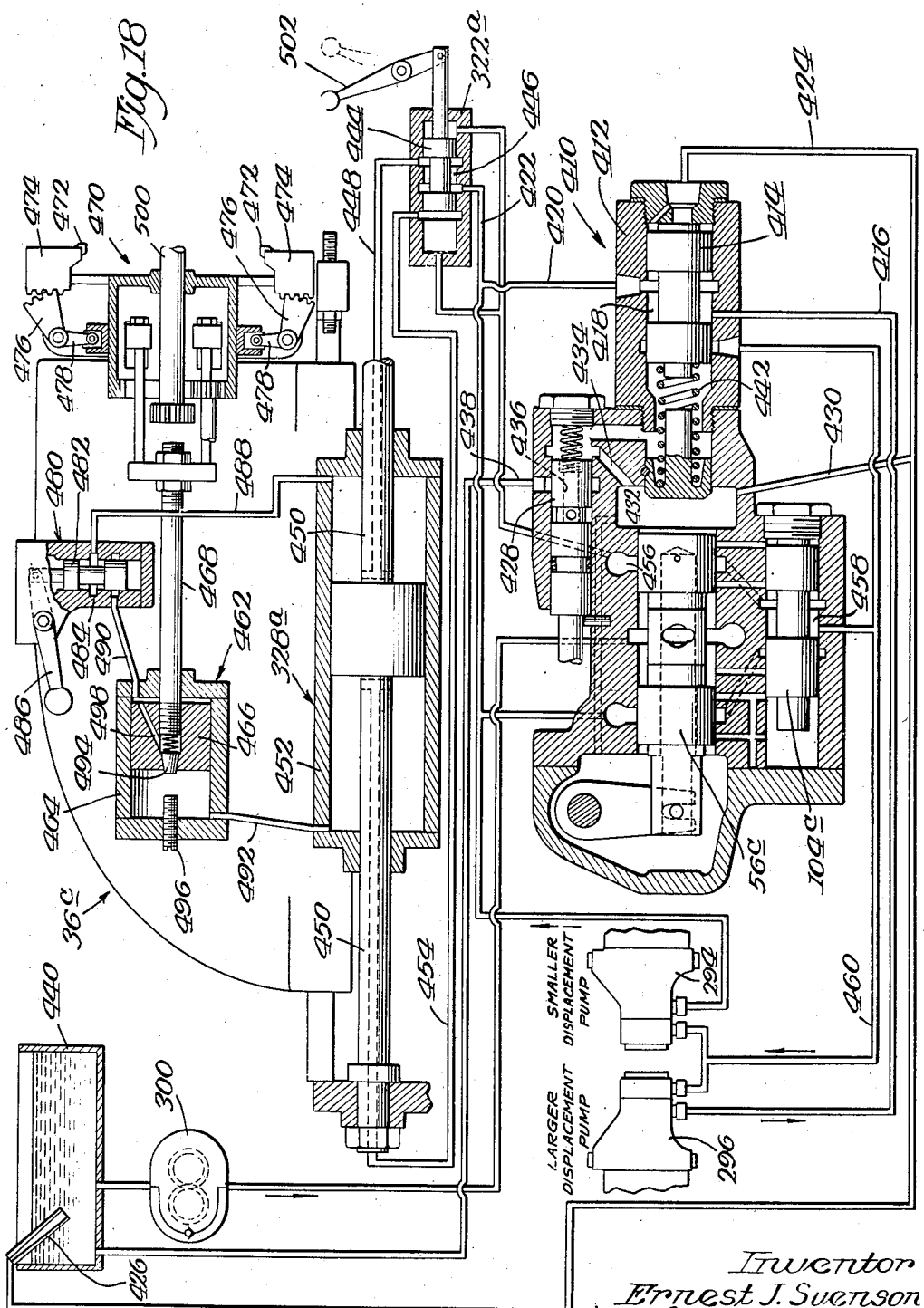

April 27, 1937.  E. J. SVENSON  2,078,698
MATERIAL WORKING APPARATUS AND HYDRAULIC SYSTEM OF CONTROL THEREFOR
Original Filed Nov. 1, 1933   10 Sheets-Sheet 7
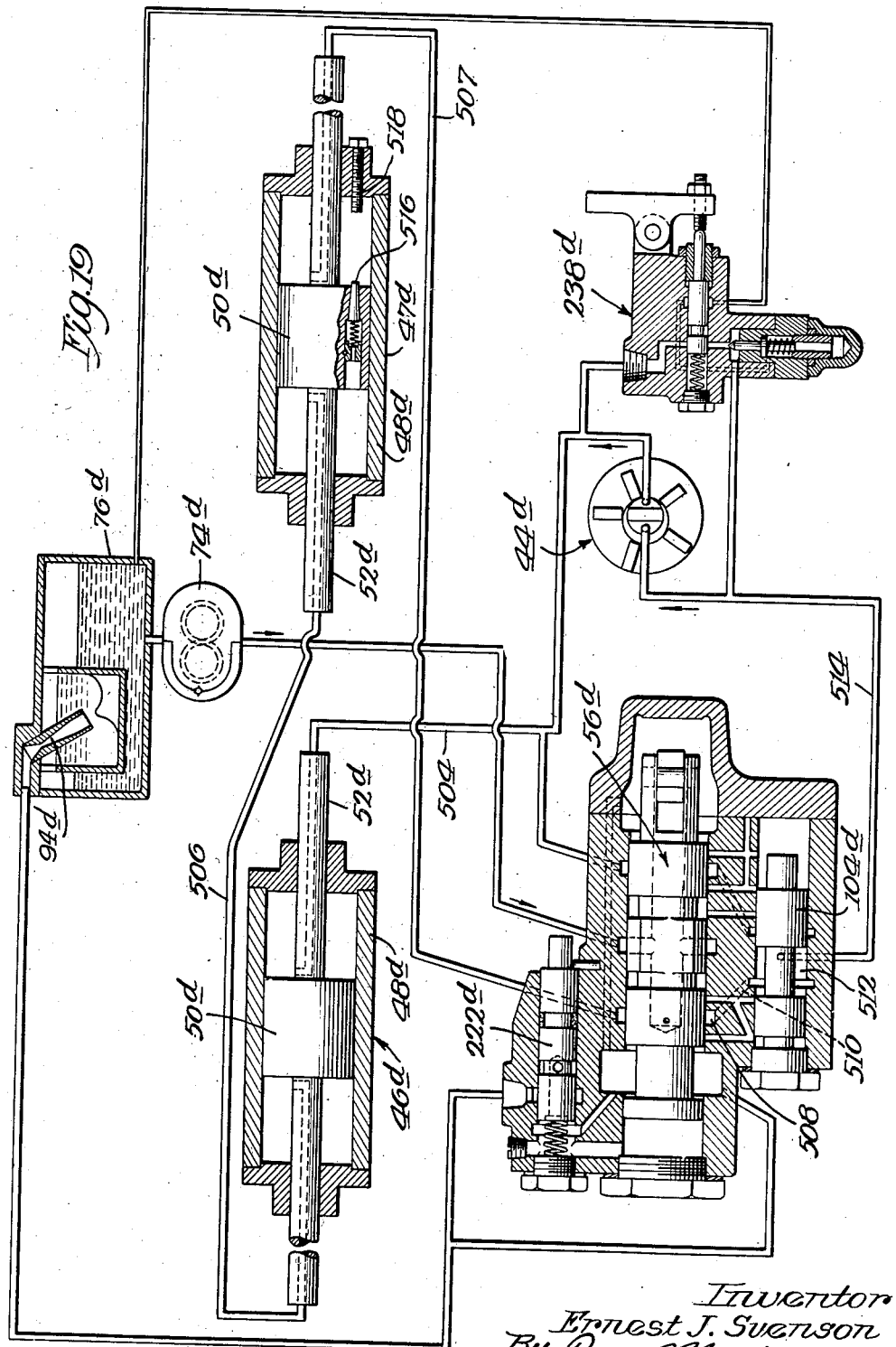
Inventor
Ernest J. Svenson
By Cox & Moore Attys April 27, 1937.  E. J. SVENSON  2,078,698
MATERIAL WORKING APPARATUS AND HYDRAULIC SYSTEM OF CONTROL THEREFOR
Original Filed Nov. 1, 1933  10 Sheets-Sheet 8

Inventor:
Ernest J. Svenson
By Cox & Moore
Attys.

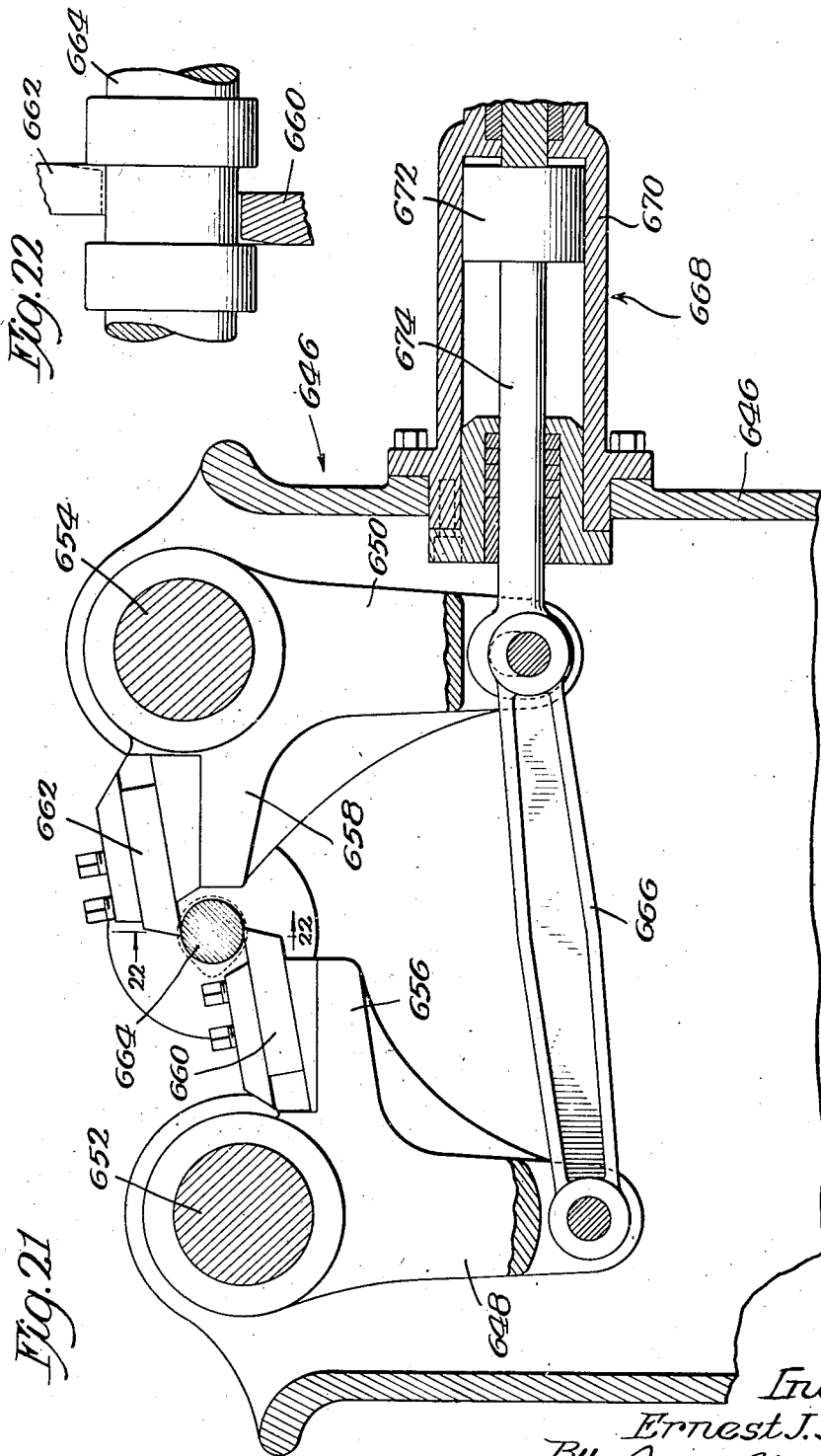

April 27, 1937. E. J. SVENSON 2,078,698
MATERIAL WORKING APPARATUS AND HYDRAULIC SYSTEM OF CONTROL THEREFOR
Original Filed Nov. 1, 1933 10 Sheets-Sheet 10

Inventor
Ernest J. Svenson
By Cox & Moore
Attys

Patented Apr. 27, 1937

2,078,698

UNITED STATES PATENT OFFICE 2,078,698

MATERIAL WORKING APPARATUS AND HYDRAULIC SYSTEM OF CONTROL THEREFOR

Ernest J. Svenson, Rockford, Ill.

Application November 1, 1933, Serial No. 696,284
Renewed August 10, 1936

61 Claims. (Cl. 29—38)

This invention relates generally to material working apparatus and hydraulic systems of control therefor, and more particularly to machine tools and improved hydraulic systems for controlling the timed functioning of machine tools.

The use of hydraulic mechanisms for propelling machine tools and the like has, during recent years, been given considerable attention by machine tool designers and builders. To my knowledge, it has been the practice heretofore in many instances to apply hydraulic systems of control to a machine tool without giving sufficient preliminary consideration as to whether or not the control system selected was particularly suitable for the structural environment presented by the machine tool per se. It is my belief that one of the most difficult problems confronting those particularly interested in the art of machine tool design, is that of supplying a hydraulic system of propulsion or control, which is suitable for the particular environment in which it is to operatively function. In order to obtain the maximum benefit or usefulness of the hydraulic system of propulsion, it is essential that the structural features forming a part thereof be designed with the utmost precision. It is, therefore, one of the important objects of the present invention to provide simple and highly efficient hydraulic actuator systems, which are arranged to satisfy all of the working conditions of the machine tool with which they are to be employed.

More particularly, my invention contemplates a machine tool and a system of control therefor, wherein the proper timed functioning of a hydraulic actuator for propelling a machine part may be controlled more accurately and positively.

Another object of the present invention is to provide a hydraulic propulsion and control arrangement which is particularly adaptable for use with machine tools designed to perform varied and successive operations upon a work piece.

A further object of my invention is to provide in systems of the above mentioned type improved mechanism for obtaining a predetermined dwell of an actuator at any desired interval in the cycle of operation.

Still another object of the present invention is to provide an improved control arrangement wherein a plurality of feeding speeds may be imparted to a machine part in response to the actuation of a simple unitary control mechanism, which is free from conventional "load and fire" spring arrangements, and depends solely upon hydraulic power for shifting a control device.

More specifically, the invention contemplates the use of two feed pumps, one to be used for slow feeding purposes, and the two combined to be used for increased speed, the functioning of said pumps being controlled through the agency of a simple unitary control mechanism.

Still more specifically, the invention contemplates a hydraulic control mechanism for the multi-speed feeding arrangement set forth above wherein a control element is adapted to be shifted to at least two different positions without the aid of auxiliary spring devices and the like, and in each of the positions said control element performs a predetermined function in selectively controlling the delivery of fluid from the pumps to an actuator.

In carrying out the foregoing object, I propose to employ a main valve, and a control element which is operable in response to the shifting of said main valve to thereby selectively control the operative functioning of the pumps.

It is a further object of the invention to provide the two-speed feeding arrangement employing a plurality of pumps in combination with means such as another pump adapted to deliver fluid to the actuator for rapid traverse purposes, and under such circumstances, a main operating valve serves to control the delivery of fluid from said rapid traverse pump to the actuator.

Another object is to enable the use of a plurality of constantly driven feed pumps in combination with means for selectively controlling the delivery of fluid from said pumps to an actuator without disconnecting said pumps from their prime movers.

Another object of my invention is to provide an improved self-contained pump unit, which includes a unitary frame providing a support for at least two feed pumps, a rapid traverse pump and a fluid reservoir.

The present invention also contemplates an improved hydraulic system of control wherein a series arrangement is provided to enable the movement of one actuator to be controlled in response to the fluid delivered from the discharge side of another actuator in combination with improved means for controlling the timed functioning of said actuators.

My invention also contemplates the provision of an improved system of hydraulic control wherein a plurality of master actuators are employed to control the operative functioning of a plurality of actuators adapted to move machine parts and the like.

A further object is to provide in a machine tool an improved hydraulic actuator control for a pair of tool supports positioned on opposite sides of the axis of a rotary work support, a single actuator being adapted to simultaneously cause the shifting of both tool supports, and thereby simultaneously affect the positioning of supported tools with respect to a work piece.

The foregoing and numerous other objects and advantages will be more apparent from the following detailed description when considered in connection with the accompanying drawings, wherein Figure 1 is a fragmentary side elevational view of a boring machine which is representative of one machine adapted to be equipped with my improved system of control;

Figure 2 is an enlarged fragmentary view of the central portion of the machine shown in Figure 1 to more clearly illustrate the position of the circuit control mechanisms and the dogs cooperatively arranged therewith;

Figure 3 is a fragmentary transverse sectional view taken substantially along the line 3—3 of Figure 2;

Figure 4 is a fragmentary plan sectional view of the dogs and valve actuating fingers, said view being taken substantially along the line 4—4 of Figure 2;

Figure 5 is a fragmentary transverse vertical sectional view taken substantially along the line 5—5 of Figure 2;

Figure 6 is a detail central sectional view of the hydraulic actuator, which is adapted to automatically effect the shifting of the main control valve, said view being taken substantially along the line 6—6 of Figure 3;

Figure 10:
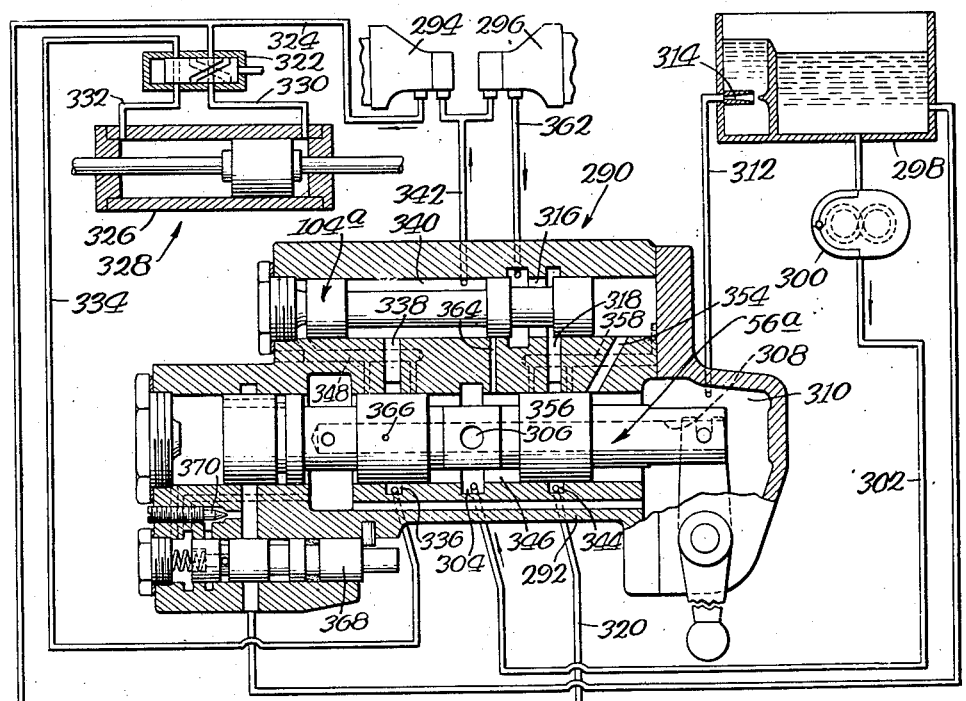
Figures 11, 12:
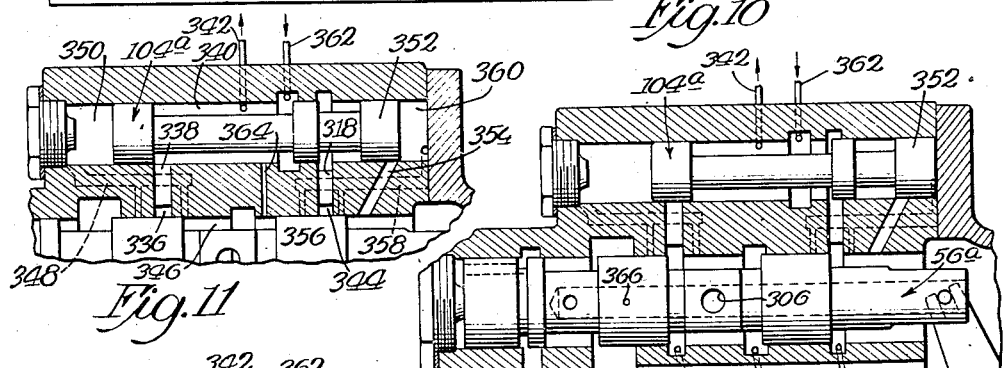
Figures 13, 14:
Figure 20:
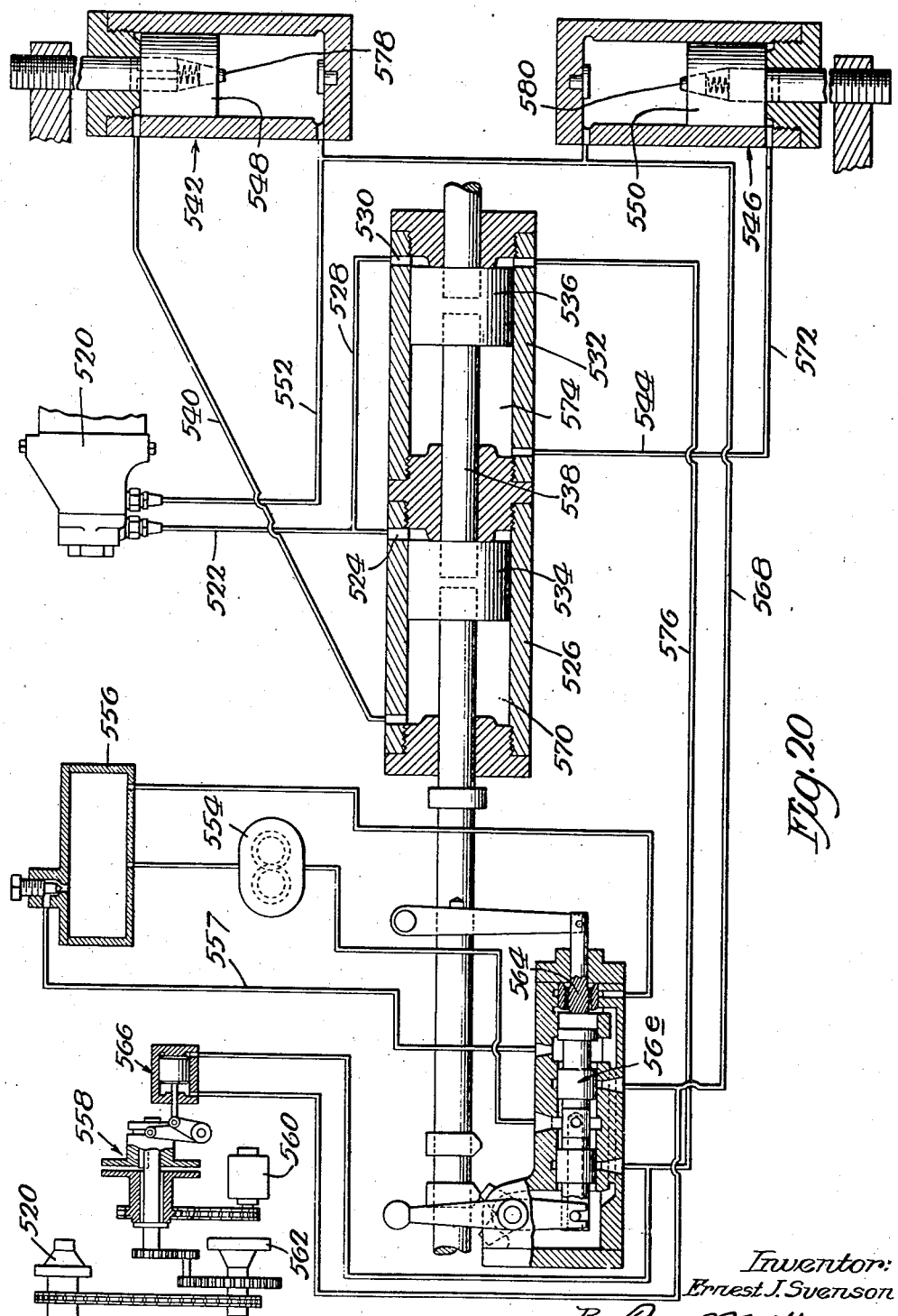
Figure 23:
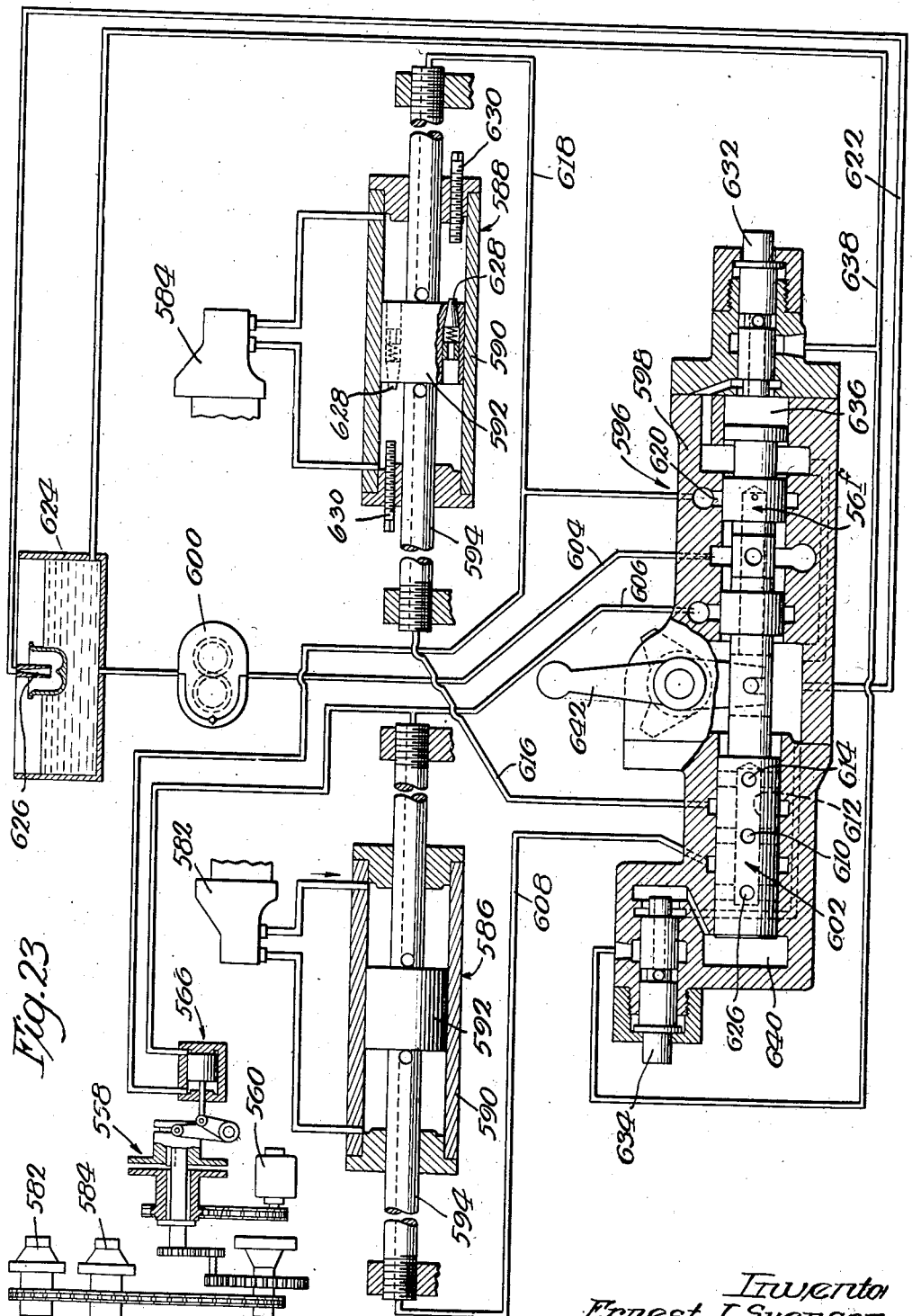

Figure 7 discloses the hydraulic circuit arrangement for controlling the functioning of the spindle head shown in Figure 1;

Figure 8 is a detail central sectional view of a reversing control mechanism adapted to be used when desired in combination with the circuit of Figure 7;

Figure 9 discloses a hydraulic circuit arrangement coupled with machine elements to disclose the manner in which an indexing mechanism is hydraulically controlled in timed relation with the movements of the spindle supporting heads;

Figure 10 is a circuit diagram of a modified hydraulic control arrangement wherein two feed pumps are employed in combination with means for selectively controlling the functioning thereof;

Figure 11 discloses the feed pump control element shifted to its first position which it occupies when the main control valve is shifted slightly toward its reverse position;

Figure 12 discloses the position occupied by the feed pump control element when the main control valve occupies its reverse position;

Figure 13 discloses the position occupied by the feed pump control element when the main valve has been shifted to its rapid approach position;

Figure 14 discloses the position occupied by the feed pump control element when the main control valve has been shifted from the reverse position to its neutral position;

Figure 15 discloses the pump unit particularly adapted for use in connection with machine tools employing a hydraulic system of control which uses the two-speed feeding arrangement, a portion of the unit being shown in section in order to more clearly illustrate the internal arrangement thereof;

Figure 16 is a fragmentary view of the pump unit as viewed from the right of Figure 15;

Figure 17 is an enlarged fragmentary sectional view of the ball valve arrangement in the pump disclosed in Figure 15;

Figure 18 discloses a modified hydraulic actuator control with a two-speed feeding arrangement and means for hydraulically controlling the radial movement of cutting tools carried by a spindle head;

Figure 19 is a modified hydraulic control circuit employing a series actuator construction;

Figure 20 is still another circuit arrangement wherein master cylinders are employed to control the functioning of actuators designed to propel machine parts and the like;

Figure 21 is a transverse sectional view of a machine tool equipped with a single actuator for controlling the simultaneous movement of a pair of tool supports;

Figure 22 is an enlarged transverse sectional view taken substantially along the line 22—22 of Figure 21 disclosing the positions occupied by the cutting tools; and Figure 23 is a modified circuit arrangement wherein the control valve may be unbalanced in either direction.

Referring now to the drawings more in detail wherein like numerals have been employed to designate similar parts throughout the various figures, it will be seen that for the purpose of illustrating the practical application of my improved systems of hydraulic propulsion, I have shown the same in operative association with a material working apparatus or boring machine designated generally by the numeral 30 (Figure 1). This apparatus or machine includes an elongated base or bed 32, which is provided along its upper surface with guides 34.

Reciprocably mounted upon the guides 34 is a head 36. In the drawings I have disclosed a fragmentary portion of the machine, and it will be understood that in a complete machine a head, similar to the head 36, is positioned oppositively to the head 36 and is reciprocable upon the guides 34. For a clear understanding of the present invention, the disclosure of a single head or unit 36 will suffice. To the right of the head 36 I indicate fragmentarily a work holding mechanism 38, which includes an indexable work support 40. A detailed description of the head and work support is not essential to an understanding of the invention, and I do not claim as a part of the present invention the structural details of the head or work support, except as these parts enter into the general combination of the hydraulic control mechanism. It will suffice to say that the machine is so designed that, as the head completes a reciprocation, the work support 40 is indexed so as to carry a supported work piece into alinement with another set of cutting tools. The machine is designed to perform a series of operations upon work pieces supported in the indexable work holder. A prime mover or electric motor 42 is arranged to impart rotation to the plurality of tool spindles projecting from the right end of the head 36, as clearly shown in Figure 1. A suitable feed pump 44 is also driven from the prime mover 42, and positioned immediately beneath the head 36 is a hydraulic actuator 46, which includes a cylinder 48 secured as a unit to the bottom side of the head 36 and a piston 50 connected with a piston rod 52, which is secured at its left end to the base or bed 32.

It will thus be apparent that fluid introduced within the right end of the cylinder 48 will cause the head to move to the right, and fluid introduced within the left end of the cylinder 48 will cause the head to move to the left.

The feed pump 44 is preferably of the type shown more specifically in Figures 15 and 16, later to be described. It will suffice to say that I prefer to employ a feed pump which is free from fluid slippage, namely, the slippage or leakage of fluid from the high to the low pressure side. As a further example of a type of pump which may be employed, I make reference to the pump disclosed in my copending application, Serial No. 430,867, filed February 21, 1930, which has now matured into Patent No. 1,989,117.

A main valve or control mechanism 54 is secured to the front side of the head frame 36, as clearly indicated in Figures 1 to 3, inclusive. This valve mechanism includes a valve member 56 (Figure 7) which is shiftable within a valve casing 58 through the agency of a manually operable lever or handle 60. This handle 60 is secured to a vertical shaft 62, the lower end of which carries a pair of fingers 64 and 66 adapted to be actuated by companion dogs 68 and 70, respectively, (Figure 4). These dogs are adjustably supported by a bar 72, and, as the head moves along the guides 34, these dogs operate to timingly control the shifting of the valve member 56, as will later appear. The functioning of the valve mechanism 54 and other mechanisms included within the circuit shown in Figure 7 will be best understood from a statement of operation. Assume that the valve member 56 occupies the central or neutral position shown in Figure 7, and that the feed pump 44 and a rapid traverse pump 74 are being operated by the prime mover 42. The pump 74 under such circumstances withdraws fluid from a reservoir 76 provided within the head 36, and discharges fluid through a conduit 78 to a central valve passage or port 80. This passage 80 now registers with a passage 82 in the valve member 56, which directs fluid through a second longitudinal passage 84 into an end chamber 86. The chamber 86 is in constant communication with a chamber 88 at the opposite end of the valve casing through a conduit 90. It should be understood that in the actual construction of the valve, this conduit is enclosed within the valve housing, but, for the purpose of simplifying the disclosure, said passage is shown diagrammatically in Figure 7. Fluid from the chamber 88 passes through a conduit 92, which returns fluid to the reservoir 76 through a fixed restricted orifice 94. Thus, when the valve member 56 occupies the neutral position shown in Figure 7, fluid from the pump 74 circulates therethrough against the pressure established by the presence of the restricted orifice 94, and the valve member 56 remains in balance within its casing 58. It will also be noted that fluid from the fed pump 44 is discharged through a conduit 96, a conduit 98, a valve passage or port 100, and a passage 102. At this time a feed pump control valve 104 occupies a position to the right of that shown by the solid lines in Figure 7, and thus communication between the passage 102 and the intake port of the feed pump 44 is established through a port 106 and a conduit 108. Under such circumstances the feed pump merely circulates without imparting operating fluid pressure to the actuator 46.

Before continuing with the description of the circuit in Figure 7, I call attention to the circuit disclosed in Figure 9 which is interlocked with the circuit of Figure 7. The circuit disclosed in Figure 9 serves to control the indexing of the work support 40. The shifting of this work support is controlled through the agency of a hydraulic actuator 110, which includes a cylinder 112 and a piston 114 reciprocable therein. A piston rod 116 extends from the piston 114 and is provided with rack teeth 118, which are adapted to mesh with companion teeth within a quadrant 120. A control handle 122 provided at the front side of the machine is adapted to be manually manipulated for initiating a cycle of operation. By shifting this control handle to the left, a valve member 124, forming a part of an index control mechanism designated generally by the numeral 126, is moved to the left against the action of a coil spring 128. Fluid from a reservoir 130 is delivered by a gear pump 132 through a conduit 134 to a central valve passage or port 136, and thence through a passage or port 138 and a conduit 140 to the right end of the hydraulic actuator cylinder 112. This causes the piston 114 to move to the left, thereby shifting the work support 40 one-sixth of a revolution, so as to shift a work piece previously applied to the support into position to be acted upon by a set of tools shown in Figure 1. Fluid from the left end of the cylinder 112 passes through a conduit 142 and returns through a passage or port 144 in the index control mechanism 126, and from this passage returns through a passage 146 through a return conduit 148 and a restricted orifice 150 into the reservoir 130. Power is supplied to the pump 132 from any suitable source, such as an electric motor 152.

Attention is now directed to a pair of valve actuating devices 154 and 156, each of which includes a cylinder or casing 158 and plungers or pistons 160. Fluid from the return conduit 142 is also directed at this time into association with the left end of the piston of the mechanism 154 and the right end of the piston in the control mechanism 156. In other words, fluid from the conduit 142 maintains the pistons 160 in the position shown. As the indexing piston 114 approaches the limit of its stroke to the left, an arm 162 engages the upper portion of a pivoted finger 164 and thereby releases a valve bar 166. A coil spring 168 then urges the valve bar 166 to the left, and establishes communication between the conduit 140 and a conduit 170 through an annular valve port or passage 172. This conduit 170 communicates with the inner extremities of the cylinders 158, and thus the pistons or plungers 160 are urged outwardly against the arms 174 and 176 (shown in Figure 7). At this point it will be understood that in Figure 1 I have shown only one spindle head. However, in the machine of Figure 1 two heads are employed, as previously mentioned, and under such circumstances each head is equipped with a main control valve mechanism, such as the valve mechanism 54. Hence, the arm 174 serves to control one of the valve mechanisms; and the arm 176, the other. To simplify the disclosure herein, only one of the valve mechanisms and spindle heads are shown.

Movement of the arm 174 to the left causes the valve member 56 to be shifted to its rapid approach position, which would be to the right of Figure 7. Thus it will be apparent that no automatic shifting of the main control valve member 56 takes place until the indexing of the work support has been completed. A pivoted latch member 178 (Figure 9) cooperates with a latch lug 180 on the control lever mechanism 122 to secure it in its left position against the action of the coil spring 128. The latch member 178 is pivoted at 182, and is urged in a clockwise direction by a spring 184. A relief valve 186 is provided in the reservoir 130 to take care of any excessive pressures developed by the pump 132, and suitable check valves 188, 190, and 192 are provided in association with the conduits connected with the cylinder 112 for purposes which will be apparent as the description progresses.

The manner in which the valve actuating pistons or plungers 160 act to control the shifting of the main control valve 56 to the rapid approach position will be more apparent from Figure 9. It will be seen that the arm 174 is mounted on a vertical shaft 194, the upper end of which carries a handle 196 (Figure 6) to enable manual remote control. This shaft 194 carries a gear 198, which meshes with a rack in a cross bar 200. The opposite extremity of this cross bar has a similar rack, which meshes with a gear 202 mounted on the vertical shaft 62. As previously described, this shaft 62 carries the fingers 64 and 66.

With the valve member 56 shifted to its rapid approach position, namely, to the right (Figure 7), fluid from the rapid traverse pump 74 passes into the valve housing, and thence outwardly through the conduit 98 into the right end of the actuator cylinder 48. This causes the head 36 to be moved at a rapid rate toward the work support 38, and fluid from the left end of the cylinder 48 passes outwardly through a conduit 204 into a valve passage or port 206, which now communicates with the chamber 88. Thus fluid is returned through the conduit or pipe line 92 to the restricted orifice 94 and thence to the reservoir 76. It will be observed that the central section of the valve member 56 does not present a complete cylindrical cross-section. Opposite sides of this section are relieved to present areas 208 which permits fluid to pass therethrough. As shown in Figure 7, the upper and lower sections of the central portion of the valve 56 slidably engage the companion surfaces of the bore in the casing 58, while the oppositely disposed relieved sections 208 of the valve member present a passage which permits fluid received from the conduit 78 to pass into the valve port 80, and thence into the conduit 98, when the valve member is shifted to its rapid approach position to the right. Likewise, the area 208 permits fluid received from the conduit 78 to pass into the valve port 206 when the valve member 56 occupies its left or reverse position.

As the head 36 continues to advance at a rapid rate, the finger 64 (Figure 4) engages the abutment or dog 68, thereby causing the valve member 56 to be returned to its neutral position shown in Figure 7. As the valve member 56 shifts to this position, a sudden building up of pressure is experienced within the area 208, and this is transmitted to the right end of the shiftable feed pump control member 104. This causes the member 104 to be suddenly shifted to the left position shown in Figure 7, thereby connecting the feed pump 44 in a closed circuit with the actuator 46. This circuit may be traced as follows: From the feed pump 44 through the conduit 96, the conduit 98, to the right end of the actuator cylinder 48, from the left end of said cylinder to the conduit 204 into the valve port or passage 206 through a passage 210, which now communicates with the central valve port or chamber 106. This chamber 106 now communicates through the conduit 108 with the intake side of the feed pump 44. It will be seen that the portion of the conduit 98 connected with the valve port 100 is now closed by a section 212 of the valve member 56. In this manner the head 36 and the head 36a are advanced at a feeding rate during the cutting action of the tools supported thereby.

As the heads move forwardly, a rod 214 (Figure 9) carried by the head 36, and a rod 216 carried by the other head, which is fragmentarily shown in Figure 9 and indicated generally by the numeral 36a, eventually engage rollers carried at the opposite extremities of the pivoted latch member 178, thereby releasing the control lever mechanism 122. The spring 128 automatically shifts the lever mechanism 122 to the right, thereby causing fluid from the pump 132 to be delivered to the left end of the actuator 110 and returning the piston 114 to the position shown in Figure 9. During this movement, a pawl clicks past the next tooth of a ratchet 218 in position to perform an indexing operation upon the return movement of the piston 114. It should also be noted that when the piston 114 reaches the position shown in Figure 9, fluid entering the left end of the cylinder 110 passes outwardly through the check valve 192 and then through the return conduit 140. As the piston 114 approaches the position shown in Figure 9, the arm 162 engages a companion arm 220 on the valve bar 166, and shifts said bar sufficiently to reset the latch finger 164, and thereby prevent movement of the bar to the left until the next indexing operation is completed. As the tools carried by the heads reach the limit of their cutting stroke, the right end of a valve member 222 (Figures 4 and 7) engages an abutment or dog 224. Movement of the valve member 222 to the left enables fluid from a left valve chamber 226 to follow through a passage 228, a longitudinal passage 230 within the valve member 222, an annular port 232, and then through a conduit 234, which makes an unrestricted communication of the reservoir 76. This sudden release of the fluid within the chamber 226 enables the valve member 56 to suddenly shift to its left or reverse position. The heads are now moved at a rapid rate in a reverse direction. As the heads reach their initial or starting position, the finger 66 engages the abutment or dog 70 (Figure 4), thereby automatically returning the valve member 56 to neutral. It will be understood, of course, that a similar set of dogs or fingers is associated with each head. By merely urging the lever mechanism 122 to the left, a second cycle of operation is initiated. It will be apparent that after the work support has been initially indexed through five successive stations, each successive indexing thereof will present a completed work piece at the loading position. The valve member 56 may also be manually controlled by manipulating the handle 60, as previously described, or it may be remotely controlled by manipulation of the second handle 196 (Figure 3) positioned at the back of the machine.

Attention is now directed to a slow feed mechanism indicated generally by the numeral 238 (Figure 7). This mechanism includes a casing or housing 240 secured to one side of the head, and includes a shiftable valve mechanism 242. This valve mechanism 242 is comprised of two parts, namely, a threaded member 244 and a socket member 246. The mechanism 238 is only used in instances where it is desirable to slow down the movement of a head, for example, when it is desired to make a heavier cut. This mechanism 238 serves to divert a predetermined amount of fluid before it is delivered to the actuator cylinder 48, and thereby slow up the movement of the head connected therewith. The operation of the mechanism 238 is as follows: When the head 36 continues to advance through the feeding stroke, a pivoted arm 248 carried by the mechanism 238 engages an abutment or dog 250. This swings an adjustable screw 252 into engagement with the section 246 of the valve mechanism 242, thereby causing an annular port 254 thereof to register with passages 256 and 258. With the valve member 244 in that position, fluid diverted from the conduit 98 through a conduit 260 passes through an adjustable needle valve 262, and thence into the passage 256. The position of this needle valve is controlled through the agency of a coil spring 264 interposed between an adjustable collar 266 and a flange 268. Thus the force tending to close the needle valve 262 may be controlled by adjusting the threaded collar 266. Hence, the needle valve can be adjusted so as to open only under a predetermined pressure condition established within the conduit 260. It will, therefore, be understood that by properly adjusting the needle valve 262, a predetermined amount of fluid may be diverted from the conduit 98 so as to effect a definite decrease in the rate of movement of the head. As stated above, the slow feed or bleeder valve mechanism 238 is only employed when the nature of the work piece to be machined requires it. A suitable coil spring 270 at the right end of the valve member 244 serves to automatically urge said member to the left when the screw 252 is free to be shifted.

In Figure 8 I have shown a reversing control mechanism designated generally by the numeral 272, which may be used when occasion demands. This mechanism includes a valve member 274, which is normally urged to the right into the position shown in Figure 8 by means of a coil spring 276. When the mechanism 272 is employed, the conduit or pipe line 234 is not returned directly to the reservoir 76 as shown in Figure 7, but is connected with an opening 278 in the mechanism 272 (Figure 8). Thus, when the valve member 274 is positioned as shown, fluid from the conduit 234 must pass through a restricted annular opening 280 through an outlet port 282, which communicates with a conduit 284, said conduit being connected with the conduit 92 of Figure 7. A conduit 286 is connected with the conduit 98 of Figure 7. Hence, when the pressure within the right end of the cylinder 48 increases sufficiently to set up pressure within the conduit 98, the valve member 274 shifts to the left against the action of the coil spring 276, and permits fluid from the conduit 234 to pass outwardly through a conduit 288, which is adapted to have unrestricted communication with the reservoir 76 in the same manner as described in connection with the conduit 234 (Figure 7). Thus upon the opening of the valve member 274, fluid from the left chamber 88 of the main operating fluid is suddenly released, provided the valve member 222 has been shifted to its left position. It will be apparent, however, that, even though the valve member 222 has been shifted to the left, the main valve 56 will not shift unless the valve member 274 is open. Hence, a delay in the reversal of the actuator takes place, which is dependent upon the time required to build up pressure within the actuator 48.

Referring now to Figures 10 to 14, inclusive, it will be seen that my invention contemplates the provision of a modified circuit and valve construction, which includes a valve mechanism designated generally by the numeral 290. This mechanism includes a valve casing 292 and a valve member 56a, which valve functions similarly to the valve member previously described. In Figure 10 I have shown a circuit diagram, but have refrained from showing dogs and the like for automatically controlling the functioning of the valve, inasmuch as the same operating mechanism as that previously described in connection with Figures 1 to 9, inclusive, may be employed. A description of the circuit shown in Figure 10 can be best understood from a statement of operation. It will be noted that a pair of feed pumps, namely, a pump 294 and a pump 296 of larger displacement than the pump 294 are disclosed. These pumps may be constantly driven from a prime mover, as described previously in connection with the pump 44. Fluid from a reservoir 298 is received by a rapid traverse pump 300, and delivered through a conduit 302 into a valve port 304. With the valve member 56a occupying the neutral position shown in Figure 10, the fluid circulates through the central valve port 306, a longitudinal passage 308, a valve chamber 310, and a return conduit 312 communicating with the reservoir 298 through a restricted orifice 314. A feed pump control member 104a, which functions somewhat similar to the member 104 previously described, when occupying the position shown in Figure 10, enables fluid from the pump 296 to pass through a valve port 316, a passage 318 and thence through a conduit 320, which communicates with a reversing valve 322. The discharge side of the pump 294 also communicates with the reversing valve 322 through a conduit 324. Thus fluid from both pumps is adapted to be delivered to the right end of a cylinder 326 of a hydraulic actuator 328 through a conduit 330. Fluid from the discharge side of the actuator 328 passes through a conduit 332, and thence through a conduit 334 into a valve port 336, a passage 338, a valve port 340, and then through a conduit 342, which communicates with the intake of both of the pumps 294 and 296. In other words, when the feed control member 104a occupies the position shown in Figure 10, fluid from both pumps is directed to the actuator, thereby causing said actuator to be propelled at a high rate of feed.

Assume that the valve member 56a is now shifted slightly to the left, as shown in Figure 11, without uncovering the valve ports 336 and 344. Fluid from the valve port 346 flows through a passage 348 into a chamber 350 at the left side of the feed control element or member 104a. With the member 104a in the position shown in Figure 11, fluid from the feed pump 296 merely circulates through a conduit 362, the valve port 340, and the conduit 342. The feed pump 294, however, is adapted to propel the actuator 328 at a slower feeding rate. Assume now that the valve member 56a is shifted to its rapid reverse position, namely, to the left as shown in Figure 12. This causes the member 104a to be shifted to its right position. In this position fluid from the feed pump 296 circulates as described in connection with Figure 11, and fluid from the pump 294 also circulates by delivering fluid from the conduit 324, the conduit 320, the valve port 344, which at this time is in communication with the end chamber 310, as well as the intake conduit 342. With the valve member 56a shifted to the position shown in Figure 12, fluid from the rapid traverse pump 300 is adapted to deliver fluid at a rapid rate to the actuator 328, as already described in connection with the circuit disclosed in Figure 7.

When the valve member 56a is again returned to neutral position, as shown in Figure 14, the feed pump control element 104a remains in its right position, thereby enabling the slow feed of the actuator to take place. In order to shift the control member 104a to the position shown in Figure 10, it is only necessary to shift the valve member 56a to its rapid approach position as shown in Figure 13.

From the foregoing it will be apparent that the control member 104a is adapted to be shifted to at least 3 positions, and in each position it serves to control the operative functioning of the feed pumps 294 and 296. Attention is also directed to the provision of bleed passages 364 and 366, which are employed to take care of any slight leakage in the actuator packings, etc. Also, these bleed passages serve to maintain fluid pressure at the return side of the closed feed circuit. By employing my improved feed pump control arrangement, a slow or fast feed may be introduced at any instant without the necessity of employing auxiliary devices, such as the common types of "load and fire" arrangements. By a simple manipulation of the main control valve, the feed control member may be shifted to one of three positions. In one position, namely, the position shown in Figures 10 and 13, both feed pumps are employed to deliver fluid to the actuator, thereby causing said actuator to travel at an increased feeding rate. When the control element occupies the position shown in Figure 11, a slower feed is imparted to the actuator because only one pump, namely, the pump 294, is functionally operative, the other pump 296 being circulated. In the third position, which I have shown in Figures 12 and 14, the control element serves to circulate both of the pumps. This is the position occupied when the machine, with which the circuit is employed, is idle. Thus, when the machine is idle, the main control valve 56a occupies the position shown in Figure 14. In this position both the feed and rapid traverse pumps circulate without imparting movement to the actuator. The reversing valve 322 may be of any suitable design, and may be automatically controlled in response to the movement of a machine element. The valve member 368 shown in Figure 10 is similar in functional characteristics to the valve member 222 previously described. Attention is directed to the fact that a slightly modified arrangement in the form of a needle valve 370 is employed to cause a dwell in the reversal of the main valve 56a.

Figures 15 to 17, inclusive, disclose a pump unit which is particularly adaptable for use in instances where the two feed pump arrangement, just described, is employed. This unit is designated generally by the numeral 372, and includes a main supporting frame 374. This frame may be secured as a unit to the side of a machine bed or the like, which I have designated by the numeral 376 in Figure 16. The frame 374 serves as a support for the rapid traverse pump 300, the feed pump 294 and the feed pump 296. A drive shaft 378 delivers power to the pump 296 from a gear 380, and delivers power to the pump 294 through a similar gear 382. The pumps 294 and 296 will not be described in detail in the present application because they form the subject matter of a separate application, and do not form a part of the present application, except as they combine with other elements with which they are associated. It will suffice to say that each pump includes a set of valves, namely, an intake ball valve 384, which is normally seated through the agency of a coil spring 386, and a discharge ball valve 388, which is normally maintained in its seated position by means of a coil spring 390. The seats of these valves conform with the spherical surfaces of the valves, and function to positively prevent the slippage of fluid from the high to the low pressure side. Fluid is received by the pump through a passage 392, and is delivered under higher pressure through a passage or discharge port 394. The driving mechanism 396 is eccentrically adjustable so as to vary the stroke of the plungers or pistons 398, this being accomplished by turning a shaft 400. The gear 382 also meshes with a gear 402 mounted upon the shaft, which propels the gear pump 300.

It will also be noted that the frame 374 is arranged to provide a reservoir 404, which is connected through a conduit 406 with the intake side of the gear pump 300. The discharge side of the gear pump 300 connects with a discharge conduit 408. It will thus be apparent that the above described pumping unit presents a self-contained portable arrangement, which may be produced as a standard unit and applied to any form of machine wherein the double pump arrangement, as above described, is required. The pumps 294 and 296 may be different in displacement, as previously described, or may be identical in size, depending upon the nature of the work that is to be performed. In other words, the required feeding rate of travel of the machine will determine the displacement of the pumps to be used.

In Figure 18 a modified circuit arrangement, very similar in many respects to the circuit described in Figures 10 to 14, inclusive, is disclosed. Instead of employing a three-position feed control member, a two-position feed control member 104c is employed. This member functions identically with the member shown in Figure 7. It will be noted, however, that a modified main control valve 56c is employed. Particular attention is directed to an auxiliary valve mechanism designated generally by the numeral 410. This mechanism includes a casing 412, which houses a shiftable valve or control member 414. When the valve member 414 occupies the position shown in Figure 18, fluid from the feed pump 296 is adapted to deliver fluid through a conduit 416 through a valve port 418 into a conduit 420, which communicates with a conduit 422 connected with the discharge side of the pump 294. In this manner both pumps deliver fluid through a reversing valve 322a, which functions similar to the reversing valve 322 shown in Figure 10. Thus the two pumps cooperate to drive a hydraulic actuator 328a at an increased feeding rate. The only structural difference between the actuator 328a and the actuator 328 of Figure 10 resides in the fact that the actuator 328a employs a shiftable cylinder, as distinguished from the shiftable piston shown in Figure 10. The actuator arrangement shown in Figure 18 is similar to the actuator arrangement disclosed and described in connection with the circuit of Figure 7, wherein the actuator cylinder is connected directly to the boring machine head.

Attention is directed to the fact that the normal pressure acting within a conduit 424 interposed between the right end of the cylinder 412 and a restricted orifice 426, is sufficient to maintain the member 414 in its left position, in which position the feed pump 296 is adapted to circulate without functioning to propel the actuator. However, when an unbalancing valve 428 (similar to valve 326, Figure 10, and valve 222, Figure 7) is shifted to the right in response to the engagement therewith of a machine part such as the dog 224 (Figures 2 and 4), fluid is free to flow from the right end of the casing 412 through the conduit 424, a conduit 430, a chamber 432, a passage 434, a valve passage 436, and a conduit 438 back into a reservoir 440. The release of the fluid from the right end of the valve member 414 permits a coil spring 442 to shift said valve member to the position shown in Figure 18. In that position fluid from the pump 296 is directed by the pipe line 416, the valve passage 418, and the conduit 420 through the reverse valve 322a. This valve mechanism includes a valve member 444, and when the valve member occupies the position shown in Figure 18, fluid will pass through a valve port 446 into a conduit 448, which communicates through a piston rod 450 with the right end of an actuator 452 of the actuator mechanism 328a. This causes the actuator cylinder 452 to move to the right and fluid from the opposite side of the cylinder will pass outwardly through a channel formed in the opposite section of the piston rod 450 into a conduit 454, and fluid from this conduit passes through the valve 322a and is returned to a port 456 associated with the main valve 56c. The valve 56c is now in its rapid reverse position, namely, to the right of the neutral position shown in Figure 18, and thus return fluid is directed back through a port 458 in the valve member 104c and a conduit 460 to the intake of the pumps 294 and 296. Thus, it will be apparent that when the parts occupy the foregoing positions, both pumps will be delivering fluid to the actuator 328a, thereby causing the machine part propelled thereby to move at the faster feeding rate.

It will also be apparent that when the valve 414 occupies its left position, fluid from the pump 296 circulates through the valve port 418 back through the pipe line 460 to the intake of said pump. In other words, when the valve member 414 is shifted to its left position, only one of the pumps, namely, the pump 294, operates to deliver fluid for propelling purposes to the actuator 328a.

The valve member 56c functions in the manner already described in connection with the valve 56 (Figure 7) to control the delivery of fluid from the rapid traverse pump 300 to the actuator 328a. When the valve member 56c occupies the neutral position shown in Figure 18, fluid from the pump 300 circulates through the valve and back to the reservoir 440 through the restricted orifice 426. However, when the valve 56c is shifted to the left, either manually or in response to the action of dogs as previously described, fluid from the rapid traverse pump will be directed to one end of the actuator 328a, depending upon the position of the reversing valve 444, and, likewise, when the valve member 56c is shifted to the right in response to the unbalancing of fluid produced through the agency of the valve member 428, rapid traverse fluid may be delivered in a reverse direction to the actuator 328a.

Attention is also directed to a hydraulic actuator 462, which includes a cylinder 464 and a piston 466. The piston 466 is connected through the agency of a piston rod 468 with a tool controlling mechanism indicated generally by the numeral 470. This mechanism is shown rather schematically, but enough of the structure thereof is indicated to furnish a clear understanding of the function and purpose of the actuator 462. It will be noted that movement of the actuator 462 to the left causes tools 472 mounted in tool holders 474 to move inwardly. This is accomplished through the agency of quadrants 476, which shift inwardly when the lower ends of arms 478 are shifted to the left in response to the movement of the piston rod 468. It will be apparent that the functioning of the actuator 462 is controlled by a valve mechanism 480, which includes a vertically shiftable valve member 482 within a casing 484. Control of the valve member 482 is occasioned by manual manipulation of a suitable handle 486. It will be apparent that as fluid is being discharged from the right side of the actuator cylinder 452 and the valve member 482 is lowered, fluid is introduced through a conduit 488 and thence through a conduit 490 into the right end of the actuator cylinder 464, thereby causing the piston 466 to be moved to the left, as described above. Fluid from the advancing side of the piston 466 is passed outwardly through a conduit 492 into the left end of the actuator cylinder 452. In this manner the tools 472 may be hydraulically urged inwardly at a predetermined rate to perform a facing cut on the work. In order to prevent the building up of undue pressure within the cylinder 464, I provide a conduit 494, which opens when it is moved into engagement with the adjustable screw abutment 496, and thence establishes communication between the opposite sides of the pistons 466 and deprives said pistons of any hydraulic motive power. When the plunger valve 94 opens fluid is free to pass between opposite sides of the piston through a passage 498.

It will be noted that such elements as the hydraulic actuator 328a and the actuator 462, together with the valve mechanism 480 and the tool operating devices controlled by the actuator piston 466, are all mounted as a unit within a head, which I have designated generally by the numeral 36c. A spindle 500 is adapted to be rotated from a prime mover (not shown) mounted upon the head 36c, and this spindle serves to rotate boring tools and the like (not shown). Thus the head is arranged so as to cause a plurality of tools to move in a radial direction, as well as to cause one or more tools to rotate and move in a longitudinal direction. It will also be apparent that the tools 472 may be caused to operate during a dwell of the head 36c so as to perform a facing operation. In fact, the invention contemplates a diversified application of the structures disclosed in Figure 18. It will also be noted that the reversing valve 444 may be manually controlled through the agency of a handle 502. Obviously the functioning of this valve may also be automatically controlled in response to the movement of the head 36c.

Referring now to Figure 19, it will be seen that I have disclosed a modified circuit arrangement, which is similar in many respects to the circuit disclosed in Figure 7. In order to more clearly designate the parts which are similar in both figures, I have applied like numbers in Figure 19, which bear the suffix "d". Thus, the circuit in Figure 19 includes a reservoir 76d, a rapid traverse pump 74d, a main control valve 56d, a feed pump control element 104d, a member 222d for controlling the unbalancing of the valve member 56d, and a pair of hydraulic actuators 46d and 47d. The circuit also includes a feed pump 44d and a mechanism 238d for controlling the dwell of the actuator before experiencing reversal. It will be noted that the only material difference between Figure 19 and Figure 7 resides in the fact that a pair of actuators 46d and 47d are employed, as distinguished from the single actuator 46 in Figure 7. Also, the fluid directed to and from the actuators passes through the actuator pistons 52d as distinguished from the arrangement shown in Figure 7. The pistons 52d are coupled with a piston 50d and in such a construction it is preferable to connect the cylinder 48d directly to the part to be moved, such as the head 36 shown in Figure 1.

It will be noted that fluid from the feed pump 44d passes through a conduit 504 into the right end of the actuator 46d. Fluid from the left or discharge end of the actuator 46d passes through a conduit 506 into the left end of the actuator 47d, and fluid from the discharge side of the actuator 47d passes outwardly through a conduit 507, and is returned to a valve port 508, a passage 510, a port 512, and a conduit 514 which communicates with the intake side of the pump 44d. In this manner the actuators are connected in series within a closed circuit. It will also be noted that when the actuator 47d completes its movement to the left, in response to the introduction of fluid from the actuator 46d, a plunger valve 516 engages an adjustable abutment 518. This establishes communication between the opposite sides of the piston 50d within the actuator 47d. Thus fluid pressure is prevented from being built up within the actuator due to the establishment of communication between the opposite sides thereof. Very accurate and positive control of a tool or work propelling actuator may be effected by means of the series arrangement just described. By employing the plunger valve 516, the reversal of the actuators is synchronized. It is apparent that the main control valve 56d controls the travel in both directions of the actuators 46d and 47d. By employing the control member 104d, it is possible to govern the operative functioning of the feed pump 44d without the use of clutch mechanisms and the like, or, in other words, without the necessity of arresting the movement of the pump. That is to say, the pump may be constantly driven, and, when it is not needed for propelling purposes, it circulates through the agency of the member 104d as previously described in connection with Figure 7.

In Figure 20 a modified circuit arrangement is disclosed wherein a feed pump 520 is connected by a conduit 522 with a port 524 at the right side of an actuator cylinder 526, and is also connected through a branch conduit 528 with a port 530 at the right end of an actuator cylinder 532. Thus when fluid is delivered to these actuator cylinders by the pump 520, pistons 534 and 536 connected together as a unit by means of a piston rod 538 shift to the left. Fluid from the advancing side of the piston 534 is directed through a conduit 540 to one end of a hydraulic actuator 542, and fluid from the advancing side of the piston 536 is directed through a conduit 544 to one end of a hydraulic actuator 546. This causes pistons 548 and 550, respectively, in said actuators to be shifted to the position shown in Figure 20, and fluid from the advancing side of said actuators is returned to the intake of the feed pump 520 through a conduit 552.

Thus the pistons 534 and 536 serve as master controls for the actuators 542 and 546.

A valve member 56e, which is similar in functional characteristics to the valve member 56 shown in Figure 7, serves to control the operative functioning of a rapid traverse pump 554 which is connected to a suitable reservoir 556. When the valve member 56e occupies the neutral position shown in Figure 20, fluid from the pump 554 circulates back to the reservoir through a return conduit 557, as previously described in connection with the circuits of Figure 7. When the valve member 56e occupies this neutral position shown in Figure 20 and a clutch mechanism 558 functions to couple a prime mover 560 with a machine tool spindle 562 and the feed pump 520, which is shown somewhat schematically in Figure 20, fluid under high pressure is delivered by the pump 520 to the actuator cylinders 526 and 532 as previously described. When the valve member 56e is shifted to its rapid reverse position, namely, to the right (Figure 20), either by manual manipulation or through the agency of a member 564 which serves to control the unbalancing of the valve member 56e, the clutch mechanism 558 is disengaged in response to the actuation of a hydraulic actuator 566. This causes the pump 520 to cease functioning, and fluid from the rapid traverse pump 554 is directed through a conduit 568 to the inner ends of the actuators 542 and 546. Fluid from the advancing side of the actuator piston 548 passes outwardly through the conduit 540 into a chamber 570 within the cylinder 526, and fluid from the advancing side of the piston 550 passes through a conduit 572 into a chamber 574 within the cylinder 532. In this manner the master pistons 534 and 536 are moved in a reverse direction, and fluid from the advancing sides of said pistons is returned through a conduit 576.

Attention is directed to the fact that by employing the master cylinder or piston arrangement just described, I am able to use a single pump for producing relatively high pressure in a plurality of cylinders, as distinguished from arrangements wherein two pumps are employed, one companion to each cylinder. It will be apparent that the pressure supplied by the pump 520 will be experienced in each of the ports 524 and 530. Thus, if the pump is developing a pressure of 1,000 pounds, this pressure will be experienced by each of the pistons 534 and 536. Under such circumstances the pressures within the chambers 570 and 574 may vary, depending upon the loads experienced by the actuator pistons 548 and 550.

It will be apparent that when the actuator pistons 548 and 550 are subjected to a reverse movement, the load distributed within the master cylinders 526 and 532 will maintain the proper timed movement of the actuator pistons 548 and 550. That is to say, the actuator piston, which has the least load to propel, will furnish the main propelling power for the pistons 534 and 536. Thus, fluid introduced through the conduit 540 to the chamber 570 may impose a predetermined pressure in said chamber, and fluid through the conduit 544 may be dispatched at no pressure. In fact, it is possible under certain circumstances to establish a vacuum in the chamber 574. In this manner a synchronous movement of the actuator pistons 548 and 550 is accomplished during the reversal thereof.

It will also be apparent that by employing my improved master piston or cylinder construction, a desirable compensating pressure arrangement is provided. Assuming, therefore, that 1,000 pounds pressure is applied to the right side of each of the pistons 534 and 536, and that the load experienced by the piston 548 is 500 pounds and the load experienced by the piston 550 is 1,500 pounds, a total pressure of 2,000 pounds is available through the agency of the double piston arrangement, although a single pump delivering 1,000 pounds pressure is employed. To further insure the timed reversal of the actuator pistons 548 and 550, I employ plunger valves 578 and 580, as clearly shown in Figure 20.

Referring now to Figure 23, it will be noted that I have disclosed a further modified circuit arrangement. Instead of driving a single pump, such as the pump 520 in Figure 20, I employ a pair of pumps 582 and 584 driven through the agency of the clutch mechanism 558 connected with the prime mover 560. The actuator mechanism 566 functions similarly to the mechanism described in Figure 20, and serves to operatively connect the prime mover 560 with the pumps 582 and 584 when it is desired to propel actuators 586 and 588 at a feeding rate. It will be noted that each of the pumps 582 and 584 are connected in a closed circuit with their respective actuators. Each actuator includes a cylinder 590, a piston 592, and piston rods 594. A valve mechanism designated generally by the numeral 596 includes a valve housing 598 and a main control valve member 56f. The valve member 56f functions in the same manner as the valve 56 previously described, in controlling the delivery of fluid from a rapid traverse pump 600 and in operatively governing the timed functioning of the clutch mechanism 558 which controls the operation of the feed pumps 582 and 584. Therefore, a detailed description of the functioning of the valve member 56f is not believed essential in this connection. Particular attention is directed, however, to a valve mechanism 602, which is shiftable with the valve member 56f. This valve mechanism 602 serves to control the series connection between the cylinders 590 of the actuators 586 and 588. Thus, when the valve member 56f, and consequently the mechanism or member 602, are shifted to the left, fluid from the rapid traverse pump 600 passes through a conduit 604, and thence through a conduit 606 into the right end of the actuator 586. Fluid from the left end of said actuator passes through a conduit 608, and thence through a port 610 which communicates with a central passage 612. Fluid from the central passage 612 passes through a port 614 and a conduit 616 into the left end of the actuator 588, and fluid from the right end of the actuator 588 passes through a return conduit 618 into a valve port 620, which is connected with a return conduit 622. This conduit 622 opens into a reservoir 624 through a restricted orifice 626. In the reverse position of the valve member 56f and the valve mechanism or member 602, fluid is conducted in a reverse direction to the actuators, and in this instance the fluid is directed from the conduit 616 through the valve port 610, and thence outwardly through a valve port which then communicates with the conduit 608. It will be clear, therefore, that the valve member or mechanism 602 serves to establish the series connection between the actuators 586 and 588 during the rapid traverse movement thereof. A plunger 628 is employed which engages an adjustable abutment screw 630. This plunger valve 628 serves as a compensator in timingly controlling the synchronous reversal of the actuator pistons 592.

In connection with the valve members similar to the valve member 56f previously described, I have made reference to a single valve member for effecting the unbalancing of the main valve in a given direction. In Figure 23 I have shown a pair of control members 632 and 634 which are arranged so as to control the automatic unbalancing of the valve member 56f in either direction. Therefore, when the valve member 632 is shifted to the left in response to the engagement therewith of a machine part and the like, fluid from an end chamber 636 is free to flow through the member 632 into a return conduit 638, which has unrestricted communication with the reservoir 624. This effects the sudden shifting of the valve member 56f to the right in response to the pressure of the normal balancing fluid within an oppositely disposed chamber 640. Likewise, when the valve member 634 is shifted to the right, fluid from the chamber 640 is free to flow through said member and into the return conduit 638. This causes a sudden shifting of the valve member 56f, and consequently the valve member 602, to the left. Fluid pressure acting within the chambers 636 and 640 is sufficient to normally maintain the valve members 632 and 634 in the position shown in Figure 23. In this position communication between the reservoir 624 and said chambers is closed. A suitable handle 642 is shown which may be manually manipulated to control the shifting of the main valve. However, automatic control of the valve may be had by employing the dog and slide mechanisms previously described.

In Figure 21 I have disclosed a machine tool designated generally by the numeral 644, which includes a main frame 646 and a pair of arms 648 and 650 pivotally mounted upon shafts 652 and 654, respectively. The portions of the arms adjacent the shafts 552 and 554 provide tool holders or supports 656 and 658, respectively. Tools 660 and 662 are mounted on said supports and are adapted to operatively engage a rotary work piece 664 when the arms 648 and 650 are swung to the right as shown in Figure 2. These arms are connected through the agency of a link 666. A hydraulic actuator 668 including a cylinder 670 and a piston 672, connects with the arm 650 by means of a piston rod 674. Thus movement of the actuator piston 672 to the right causes the positive and simultaneous movement of the tools 660 and 662 into operative association with the work piece 664. Likewise, the movement of the piston 672 to the left causes said tools to move away from the work piece. The functioning of the tools upon the work piece is more clearly illustrated in Figure 22.

Summary

From the foregoing description it will be apparent that my invention contemplates the provision of a hydraulic mechanism or system wherein machine tools and the like may be positively and accurately controlled in their forward and reverse movements. Also, my invention contemplates an improved arrangement whereby a predetermined dwell of an actuator during a selected interval of its cycle of operation may be obtained. The multi-feed arrangement incorporates a plurality of feed pumps, which are controlled so that one or all of the pumps may be operatively connected with an actuator whereby to propel said actuator at either a slower or faster feeding rate. The simple unitary control mechanism for governing the operative functioning of these pumps has proven very practical in the field, and precludes the necessity of employing complicated spring and other type mechanisms for shifting control valves. The pump unit described herein is of practical application in the field, because it permits of convenient detachment for purposes of repair, replacement, or removal. In this connection attention is directed again to Figures 15 and 16. It will be noted that the entire structure of the pumping mechanisms 294 and 296 is detachably mounted upon the frame 374, and also that the sections 294a and 296a of said pumping mechanisms, which support the valve and piston structures, are removable as a unit without requiring the detachment from the frame 374 of the entire pumping structure. This is of practical significance in the field because it simplifies the manner in which repair and replacement of pump parts may be accomplished without the necessity of dismantling the entire structure. Heretofore it has been the practice in many instances to house the pump structures within an inclosure filled with oil, thereby making it exceedingly difficult to gain access to the pump elements. In my improved pump unit, all of the elements are exposed for the purpose of rendering the part conveniently removable. My invention also contemplates improved means in the form of a hydraulic actuator and associated mechanisms for imparting radial movement to tools supported by a spindle head. This is hydraulically coupled with the main hydraulic actuator in a simple manner. The series and master cylinder arrangements disclosed herein present a practical system of control, which may be used in instances where the environment is particularly suited to such arrangements.

From the foregoing description it will also be apparent that, by employing the two pump arrangement, each of said feed pumps may be set to deliver fluid at a predetermined rate. In other words, one feed pump may be set to deliver fluid at one rate and another feed pump to deliver fluid at a different rate. It is desirable in certain instances to set one of the feed pumps to deliver fluid at a given feeding rate and another of said feed pumps to deliver fluid under pressure at a faster feeding rate. In using the terms "feed pump" and "rapid traverse pump" herein, I am referring to pumps of the "small delivery" and "large delivery" types, respectively. The small delivery type is usually employed to propel machine carriages, spindles, etc., at a slower or feeding rate; while the large delivery pumps are used to propel said machine elements at a faster or rapid traverse rate.

Obviously numerous other objects and advantages are obtained by employing my invention, and it is to be understood that said invention is not limited to the specific disclosures herein, but is capable of numerous other modifications and changes without departing from the spirit and scope of the appended claims.

Having thus described my invention, what I claim as new and desire to secure by Letters Patent is:

1. In a hydraulic actuator system, a hydraulic actuator for propelling shiftable supporting parts and the like at a relatively fast rate for bringing said supporting part into working position and at a plurality of relatively slow rates of travel during the working movement of said part, a plurality of feed pumps, fluid conducting means connecting said feed pumps with said actuator, and shiftable means for selectively connecting said feed pumps with said actuator, one of the pumps serving and being set to propel the actuator at a slower feeding rate, the combined another of said pumps serving and being set to propel the actuator at an increased rate of feed, power means for propelling said hydraulic actuator at said relatively fast rate of travel, and control means for said power means.

2. In a hydraulic actuator system, a hydraulic actuator for propelling shiftable supporting parts and the like at a relatively fast rate for bringing said supporting part into working position and at a plurality of relatively slow rates of travel during the working movement of said part, a plurality of feed pumps, fluid conducting means adapted to connect said feed pumps with said actuator, a control valve, and shiftable means operable in response to the shifting of the control valve for selectively connecting said feed pumps with said actuator, one of the pumps serving and being set to propel the actuator at a slower feeding rate, another of said pumps serving and being set to propel the actuator at an increased rate of feed, and power means for propelling said hydraulic actuator at said relatively fast rate of travel.

3. In a hydraulic actuator system, a hydraulic actuator for propelling shiftable supporting parts and the like at a relatively fast rate for bringing said supporting part into working position and at a plurality of relatively slow rates of travel during the working movement of said part, a plurality of feed pumps, fluid conducting means adapted to connect said feed pumps with said actuator, means for propelling said actuator at a rapid rate, means for controlling the operative functioning of said last mentioned propelling means, shiftable means for selectively connecting one or a plurality of said feed pumps with said actuator, the connection of one pump serving to propel the actuator at a relatively slow feeding rate, and the combined pumps serving to propel the actuator at an increased rate of feed, and power means for propelling said hydraulic actuator at said relatively fast rate of travel.

4. In a hydraulic actuator system, a hydraulic actuator for propelling shiftable supporting parts and the like at a relatively fast rate for bringing said supporting part into working position and at a plurality of relatively slow rates of travel during the working movement of said part, a plurality of feed pumps, fluid conducting means connecting said feed pumps with said actuator, control means for said supporting part including a member shiftable to at least two positions for selectively controlling the connection of the pumps with said actuator, said control means in one position serving to connect said pumps to propel the actuator at a faster feeding rate, and in another position serving to connect one of said pumps with said actuator to propel the actuator at a slower feeding rate, and serving in one position to effect the circulation of the fluid delivered by said pumps without imparting movement to the actuator, and power means for propelling said hydraulic actuator at said relatively fast rate of travel.

5. In a hydraulic actuator system, a hydraulic actuator for propelling shiftable supporting parts and the like, a plurality of feed pumps, fluid conducting means connecting said feed pumps with said actuator, control means for said supporting part including a member shiftable to at least two positions for selectively controlling the connection of the pumps with said actuator, said control means in one position serving to connect said pumps to propel the actuator at a faster feeding rate, and in another position serving to connect one of said pumps with said actuator to propel the actuator at a slower feeding rate, and serving in one position to render said pumps functionally inoperative for propelling purposes, and power means for propelling said hydraulic actuator at said relatively fast rate of travel.

6. In a hydraulic actuator system, a hydraulic actuator for propelling parts and the like, a plurality of feed pumps, fluid conducting means connecting said feed pumps with said actuator, control means for said supporting part including a member hydraulically shiftable to at least two positions for selectively controlling the connection of the pumps with said actuator, said control means in one position serving to connect said pumps to propel the actuator at a faster feeding rate, and in another position serving to connect one of said pumps with said actuator to propel the actuator at a slower feeding rate, and serving in one position to render said pumps functionally inoperative for propelling purposes, and power means for propelling said hydraulic actuator at said relatively fast rate of travel.

7. In a hydraulic actuator system, a hydraulic actuator for propelling shiftable supporting parts and the like, pumping mechanism for propelling said actuator, fluid conducting means connecting said pumping mechanism with said actuator, said pumping mechanism being adapted to deliver fluid at various rates of displacement to said actuator for varying the speed of said actuator, control means including a shiftable control element and a control device shiftable to at least two positions in response to the shifting of said control element for selectively controlling the rate of delivery of fluid by said pumping mechanism to said actuator and for maintaining said pumping mechanism hydraulically operative.

8. In a hydraulic actuator system, a hydraulic actuator for propelling shiftable supporting parts and the like, pumping mechanism for propelling said actuator, fluid conducting means connecting said pumping mechanism with said actuator, said pumping mechanism being adapted to deliver fluid at various rates of displacement to said actuator for varying the speed of said actuator, means for propelling said actuator at a rapid rate, valve means for controlling the operative functioning of said last mentioned propelling means with respect to said actuator, and control means including a control device operable in response to the shifting of said valve means and shiftable to at least two positions for selectively controlling the rate of delivery of fluid by said pumping mechanism to said actuator, and for maintaining said pumping mechanism hydraulically operative.

9. In a hydraulic actuator system, a hydraulic actuator for propelling shiftable supporting parts and the like, pumping mechanism for propelling said actuator at a feeding rate, fluid conducting means connecting said pumping mechanism with said actuator, control mechanism including a shiftable control member for governing the operative functioning of said pumping mechanism with respect to said actuator, said control mechanism also including a shiftable valve member adapted in one position to connect another pump mechanism for propelling said actuator in a reverse direction, and means having a valve responsive to increases in pressure developed as the actuator reaches the completion of its forward movement, for effecting a dwell of the actuator and thereby retarding the reversal thereof, said shiftable control member functioning to arrest said actuator prior to the reversal thereof.

10. In a hydraulic actuator system, a hydraulic actuator for propelling shiftable supporting parts and the like, pumping mechanism for propelling said actuator at a feeding rate, fluid conducting means connecting said pumping mechanism with said actuator, control mechanism including a shiftable control member for governing the operative functioning of said pumping mechanism with respect to said actuator, a pump for delivering fluid at a relatively rapid rate to said actuator, control valve mechanism for connecting said last mentioned pump in forward and reverse directions with said actuator, control means for governing the shifting of said valve mechanism to its reverse position, and means operable in response to the fluid pressure condition in said actuator for effecting a dwell of the actuator when said actuator reaches the limit of its forward movement to thereby retard the reversal of said actuator, said shiftable control member functioning to arrest said actuator prior to the reversal thereof.

11. In a hydraulic actuator system, a hydraulic actuator for propelling shiftable supporting parts and the like, pumping mechanism for propelling said actuator at a feeding rate, fluid conducting means connecting said pumping mechanism with said actuator, a pump for delivering fluid at a relatively rapid rate to said actuator, control valve mechanism for connecting said last mentioned pump in forward and reverse directions with said actuator, control means for governing the shifting of said valve mechanism to its reverse position, and dwell control mechanism including a restricted orifice and means operable in response to the fluid pressure condition in said actuator for controlling the effectiveness of said orifice in causing a dwell of the actuator when said actuator reaches the limit of its forward movement to thereby retard the reversal of said actuator.

12. In combination with a shiftable head frame and an indexable work support adapted to secure work in position to be acted upon by tools carried by said head frame, a hydraulic actuator for shifting said head frame toward and away from said work support, a feed pump for propelling said actuator at a feeding rate, a rapid traverse pump for propelling said actuator at a rapid rate, control valve mechanism for governing the operative functioning of said pumps, actuator mechanism for effecting successive indexing movements to said work support, and a unitary acting control means operable to effect a cycle of operation wherein an indexing movement takes place first and is immediately followed by the rapid and subsequent feeding approach movement of the head frame and the automatic reversal of said head frame upon the completion of the feeding movement.

13. In combination with a shiftable head frame and an indexable work support adapted to secure work in position to be acted upon by tools carried by said head frame, a hydraulic actuator for shifting said head frame toward and away from said work support, a feed pump for propelling said actuator at a feeding rate, a rapid traverse pump for propelling said actuator at a rapid rate, control valve mechanism for governing the operative functioning of said pumps, actuator mechanism for effecting successive indexing movements to said work support, a unitary acting control means operable to effect a cycle of operation wherein an indexing movement takes place first and is immediately followed by the rapid and subsequent feeding approach movement of the head frame and the automatic reversal of said head frame upon the completion of the feeding movement, and means for effecting a dwell of the actuator before reversal thereof takes place.

14. In a machine tool, a head frame, a tool driving spindle rotatable within said frame, a plurality of tool holders positioned adjacent said tool driving means, said tool holders and spindle being relatively shiftable radially with respect to the axis of said spindle, a work support, a hydraulic actuator for relatively moving said head frame and work support to effect relative longitudinal movement of said spindle and work support, pumping mechanism for delivering fluid to said actuator, and hydraulic mechanism for controlling the relative radial movement of said tool holders and said tool driving spindle.

15. A pump supporting unit including a unitary frame structure, rotary driving mechanism mounted within said frame structure, a plurality of feed pumps mounted upon said frame structure and driven from said driving mechanism, and a rapid traverse pump mounted on said unitary frame structure, all of said pumps being detachably mounted with respect to said frame structure, a portion of said frame structure providing a reservoir for receiving fluid.

16. A pump supporting unit including a unitary frame structure, rotary pump driving mechanism carried by said frame structure, a plurality of feed pumps mounted upon said frame structure and driven from said driving mechanism, said feed pumps including a section mounted directly upon the frame structure and carrying the portion operatively connecting the drive section and another section which supports the pressure developing elements of the pump, said latter section being detachable with respect to the first section without disturbing the driving connection with the rotary driving mechanism, and a rapid traverse pump carried by said unitary frame structure and coupled with said rotary driving mechanism.

17. In a machine tool, a frame, a plurality of tool supports including a pair of oppositely disposed supports mounted on said frame and adapted to carry tools, a rotary work support, the operating extremities of said tool supports being positioned on opposite sides of said rotary work support, a hydraulic actuator including a cylinder and piston construction for controlling simultaneous movement of said tool supports so as to move supported tools toward a supported work piece, and valve means for directing fluid to said hydraulic actuator.

18. In a hydraulic actuator system, a plurality of hydraulic actuators connected in series, pumping mechanism for delivering fluid to the intake side of one of said actuators, valve mechanism for controlling the operative functioning of said pump with respect to said actuators, the movement of the first actuator serving to impart movement to an actuator connected in series therewith, and means for preventing the building up of pressure when one of said actuators reaches the limit of its movement in advance of the other actuator.

19. In a hydraulic actuator system, a plurality of hydraulic actuators connected in series, pumping mechanism for delivering fluid to the intake side of one of said actuators, valve mechanism for controlling the operative functioning of said pump with respect to said actuators, the movement of the first actuator serving to impart movement to an actuator connected in series therewith, and means for effecting a dwell of said actuators when they reach the limit of their forward movement, whereby to retard the reversal of said actuators.

20. In a hydraulic actuator system, a hydraulic actuator mechanism including a plurality of master pistons and an actuator cylinder companion to each piston, means connecting said actuators together as a unit whereby when relative movement between the piston and one cylinder takes place, similar movement will take place between the other piston and companion cylinder, means for supplying fluid to propel said actuator mechanism, a hydraulic actuator connected with the advancing side of one of said pistons, another hydraulic actuator connected with the advancing side of the other piston, whereby fluid discharged from the advancing side of said pistons will serve to impart movement to the last mentioned actuators, said fluid supplying means being adapted to deliver fluid at substantially the same pressure to the intake side of said pistons, and means for controlling the operative functioning of said fluid supplying means.

21. In combination with a machine tool frame and a hydraulic actuator associated therewith, a hydraulic unit structure including supporting means detachably connectable with said machine tool frame, a plurality of plunger pumps on said supporting means, said plunger pumps having fluid responsive valve means, means for hydraulically coupling said plunger pumps for propelling purposes with said actuator in a manner to allow fluid under pressure to be dispatched from the discharge side of said actuator in response to fluid pressure acting on the intake side thereof, a rapid traverse pump on said supporting means hydraulically connectable with said actuator, a prime mover associated with said unit and connected with said plunger pumps for imparting movement to the plungers thereof in at least one direction, and valve means for directing fluid from said plunger pumps to the actuator, one of said plunger pumps being set to propel the actuator at a slower feeding rate and another of said pumps being set to propel the actuator at a different rate of feed, whereby to permit fluid pressure at the intake of said plunger pump to cooperate with the prime mover in imparting reciprocation to said plungers.

22. In a hydraulic actuator system, a hydraulic actuator for shifting machine parts and the like, a plurality of feed pumps, each including a plurality of reciprocable pistons and fluid responsive valve means for governing the flow of fluid toward and away from said pistons, a rotary spindle, a prime mover for synchronously driving said spindle and pumps, fluid conducting means connecting the discharge side of said pumps with the intake side of said actuator, fluid conducting means for directing fluid from the discharge side of said actuator to the intake side of said pumps, said connections being such as to enable the establishment of fluid pressure at the discharge side of said actuator, whereby to cooperate with said prime mover in establishing synchronism between rotation of said spindle and movement of said hydraulic actuator, and valve means for controlling the direction of travel of said actuator.

23. In a hydraulic actuator system, a hydraulic actuator for shifting machine parts and the like, a plurality of feed pumps, each including a plurality of reciprocable pistons and fluid responsive ball valve means for governing the flow of fluid toward and away from said pistons, a rotary spindle, a prime mover for synchronously driving said spindle and pumps, fluid conducting means connecting the discharge side of said pumps with the intake side of said actuator, fluid conducting means for directing fluid from the discharge side of said actuator, said conducting means being such as to enable the establishment of fluid pressure at the discharge side of said actuator, whereby to cooperate with said prime mover in establishing synchronism between rotation of said spindle and movement of said hydraulic actuator, and valve means for controlling the direction of travel of said actuator.

24. In a hydraulic actuator system, a hydraulic actuator for shifting machine parts and the like, a plurality of feed pumps, each including a plurality of reciprocable pistons and fluid responsive valve means for governing the flow of fluid toward and away from said pistons, yieldable means for normally urging said valve means toward a seated position, a rotary spindle, a prime mover for synchronously driving said spindle and pumps, fluid conducting means connecting the discharge side of said pumps with the intake side of said actuator, fluid conducting means for directing fluid from the discharge side of said actuator, said conducting means being such as to enable the establishment of fluid pressure at the discharge side of said actuator, whereby to cooperate with said prime mover in establishing synchronism between rotation of said spindle and movement of said hydraulic actuator, and valve means for automatically controlling the direction of travel of said actuator.

25. In a hydraulic actuator system, a hydraulic actuator for shifting machine parts and the like, a plurality of feed pumps, each including a plurality of reciprocable pistons and fluid responsive valve means for governing the flow of fluid toward and away from said pistons, a rotary spindle, a prime mover for synchronously driving said spindle and pumps, fluid conducting means connecting the discharge side of said pumps with the intake side of said actuator, fluid conducting means for directing fluid from the discharge side of said actuator to the intake side of said pumps, said connections being such as to connect said actuator and pumps in a closed circuit to thereby enable the establishment of fluid pressure at the discharge side of said actuator, whereby to cooperate with said prime mover in establishing synchronism between rotation of said spindle and movement of said hydraulic actuator, and valve means for controlling the direction of travel of said actuator.

26. A hydraulic actuator system including a plurality of hydraulic actuators, a feed pump companion to each actuator, valve means for causing simultaneous movement in either direction of said hydraulic actuators, driving means for said feed pumps, control means including a fluid actuator operable in accordance with the position of said valve means for causing said feed pumps to operatively function when said actuators move in a given direction and for causing said pumps to be rendered functionally inoperative when said hydraulic actuators move in the opposite direction, means for hydraulically shifting said valve means in opposite directions, and means within said valve means to connect said actuators in series or parallel.

27. In combination with a shiftable head frame, a work positioning and supporting member arranged to receive a work part and to transmit and locate said work part in a manner to allow a tool on said head frame to operate upon the work in various positions, a hydraulic actuator for shifting said head frame toward and away from said supporting member, a feed pump for propelling said actuator at a feeding rate, a rapid traverse pump for propelling said actuator at a rapid rate, control valve mechanism for governing the operative functioning of said pumps, actuator mechanism for effecting successive movements of said work support, and a unitary acting control means operable to effect a cycle of operation wherein the movement of the work support takes place first and is immediately followed by the rapid and subsequent feeding approach movement of the head frame and the automatic reversal of said head frame upon completion of the feeding movement.

28. In combination with a shiftable head frame, rotatable tool driving mechanism thereon, a work positioning and supporting member arranged to receive a work part and to transmit and locate said work part in a manner to allow a tool on said head frame to operate upon the work in various positions, a hydraulic actuator for shifting said head frame toward and away from said supporting member, a feed pump for propelling said actuator at a feeding rate, a rapid traverse pump for propelling said actuator at a rapid rate, control valve mechanism for governing the operative functioning of said pumps, actuator mechanism for effecting successive movements of said work support, and a unitary acting control means operable to effect a cycle of operation wherein the movement of the work support takes place first and is immediately followed by the rapid and subsequent feeding approach movement of the head frame and the automatic reversal of said head frame upon completion of the feeding movement.

29. In material working apparatus, a head frame, a rotary tool support, a plurality of material working elements, said material working elements and rotary tool support being relatively shiftable radially with respect to the axis of said support, rotary driving means therefor, a work support, a hydraulic actuator for relatively moving said head frame and said work support to effect relative longitudinal movement of said rotary tool support and work support, pumping mechanism for delivering fluid to said actuator, and hydraulic mechanism for controlling the relative radial movement of said material working elements and said rotary tool support.

30. In material working apparatus, a head frame, a rotary tool support, a plurality of material working elements, said material working elements and rotary tool support being relatively shiftable radially with respect to the axis of said support, rotary driving means therefor, a work support, a hydraulic actuator for relatively moving said head frame and said work support to effect relative longitudinal movement of said rotary tool support and work support, pumping mechanism including at least two feed pumps for delivering fluid to said actuator, and hydraulic mechanism for controlling the relative radial movement of said material working elements and said rotary tool support.

31. In material working apparatus, a frame, rotary tool driving mechanism thereon, a plurality of work supports including a pair of oppositely disposed supports pivotally mounted on said frame and adapted to carry tools, the opposite extremities of which are adapted to be positioned on opposite sides of a supported work piece, a support for said work piece arranged to transmit and locate said work piece so as to permit a supported tool to operate thereon in various positions, means linking said tool supports together at points spaced from their pivotal axes, and a hydraulic actuator including a cylinder and piston construction for imparting simultaneous movement to said tool supports about their axes so as to move supported tools toward and away from a supported work piece.

32. In a hydraulic actuator system, a hydraulic actuator mechanism including a master actuator constructed and arranged to displace propelling fluid to a plurality of remotely positioned actuators, a plurality of actuators positioned remotely with respect to said master actuator, fluid conducting means connecting said master actuator with said remotely located actuators, means within said master actuator for volumetrically controlling the amount of fluid displaced to said remotely located actuators whereby to govern the rate and distance of travel in accordance with fluid displacement, and pumping means hydraulically coupled with said master actuator in a manner to balance the pressure within said master actuator.

33. In a hydraulic actuator system, a hydraulic actuator mechanism including a master actuator constructed and arranged to displace propelling fluid to a plurality of remotely positioned actuators, a plurality of actuators positioned remotely with respect to said master actuator, fluid conducting means connecting said master actuator with said remotely located actuators, means within said master actuator for volumetrically controlling the amount of fluid displaced to said remotely located actuators whereby to govern the rate and distance of travel in accordance with fluid displacement, pumping means hydraulically coupled with said master actuator in a manner to balance the pressure within said master actuator, and pumping means for imparting rapid traverse to said master actuator.

34. In a hydraulic actuator system, a hydraulic actuator mechanism including a master actuator constructed and arranged to displace propelling fluid to a plurality of remotely positioned actuators, a plurality of actuators positioned remotely with respect to said master actuator, fluid conducting means connecting said master actuator with said remotely located actuators, means within said master actuator for volumetrically controlling the amount of fluid displaced to said remotely located actuators whereby to govern the rate and distance of travel in accordance with fluid displacement, pumping means hydraulically coupled with said master actuator in a manner to balance the pressure within said master actuator, pumping means for imparting rapid traverse to said master actuator, and valve means for controlling the delivery of fluid from said last mentioned pumping means to said master actuator.

35. In a hydraulic actuator system, a hydraulic actuator mechanism including a master actuator constructed and arranged to displace propelling fluid to a plurality of remotely positioned actuators, a plurality of actuators positioned remotely with respect to said master actuator, fluid conducting means connecting said master actuator with said remotely located actuators, means within said master actuator for volumetrically controlling the amount of fluid displaced to said remotely located actuators whereby to govern the rate and distance of travel in accordance with fluid displacement, pumping means hydraulically coupled with said master actuator in a manner to balance the pressure within said master actuator, pumping means for imparting rapid traverse to said master actuator, and valve means including control means actuated by said master actuator for controlling the starting speed and reversal of said master actuator.

36. A hydraulic actuator system including a plurality of hydraulic actuators, a feed pump companion to each actuator, means to adjustably vary the displacement of at least one of said feed pumps to thereby vary the speed of the actuator coupled therewith, valve means for causing simultaneous movement in either direction of said hydraulic actuators, driving means for said feed pumps, control means including a fluid actuator operable in accordance with the position of said valve means for causing said feed pumps to operatively function when said actuators move in a given direction and for causing said pumps to be rendered functionally inoperative when said hydraulic actuators move in the opposite direction, means within one of said actuators for controlling the starting position of the last actuator to complete its movement, and means within said valve means to connect said actuators in series or parallel.

37. In material working apparatus, a supporting member, a shiftable actuator connected with said supporting member, a plurality of feed transmissions for propelling said actuator at various rates of speed when said actuator is subjected to a working load, another transmission for propelling said actuator at a relatively high rate of speed during travel to and from said working position, and a control determinative for causing said actuator to be propelled by all of said transmissions to thereby cause said actuator to experience a fast rate of speed and also to be propelled by two of said feed transmissions to impart another rate of speed to said actuator, and further to enable one of said transmissions to propel said actuator at a relatively low rate of speed.

38. In a fluid transmission system for machine tools and the like, a first fluid power circuit including fluid power generating means therefor, control mechanism including a shiftable plunger within a housing for determining starting and stopping of the fluid flow in said circuit, a second fluid power circuit having a second fluid power generating means and including a shiftable plunger within said control housing for starting and stopping the fluid flow in said second circuit, and a fluid flow control mechanism including means for modifying the flow of fluid in said second circuit, and control means for timingly initiating the starting of said modified flow.

39. In a fluid transmission system for machine tools and the like, a first fluid power circuit including fluid power generating means therefor, control mechanism including a shiftable plunger within a housing for determining starting and stopping of the fluid flow in said circuit, a second fluid power circuit having a second fluid power generating means and including a shiftable plunger within said control housing for starting and stopping the fluid flow in said second circuit, and a diverting mechanism for diverting a predetermined amount of fluid in one of said circuits, including valve means for initiating the starting and for stopping said diverting.

40. In a fluid transmission system for machine tools and the like, a first fluid power circuit including fluid power generating means therefor, control mechanism including a shiftable plunger within a housing for determining starting and stopping of the fluid flow in said circuit, a second fluid power circuit having a second fluid power generating means and including a shiftable plunger within said control housing for starting and stopping the fluid flow in said second circuit, and fluid control means automatically and operatively responsive to the fluid flow in said second circuit for decreasing the amount of flow into the second circuit.

41. In a fluid transmission system for machine tools and the like, a first fluid power circuit including a large volume fluid power generating means therefor, control mechanism including a shiftable plunger within a housing for determining starting and stopping of the fluid flow in said circuit, a second variable flow fluid circuit including an adjustable flow fluid power generating means therefor, a shiftable plunger within said control housing for starting and stopping the fluid flow in said second circuit, and a fluid flow control mechanism adapted to automatically function in response to the effective fluid flow in said second circuit whereby the effective fluid for transmission purpose in said second circuit is modified.

42. A control mechanism for fluid power circuits and the like, adapted to receive fluid from an associated fluid power generating means, a shiftable plunger within said control mechanism for directing dispatchment of fluid in at least two directions, means for enabling the shifting of said plunger by fluid power in at least one direction, a second fluid actuated plunger within said control mechanism for causing a modified fluid dispatchment in a direction selected by said first plunger, a fluid flow control means for further modifying said fluid dispatchment, and valve means for controlling the effectiveness of said flow control means.

43. A control mechanism for fluid power circuits and the like, adapted to receive fluid from an associated fluid power generating means, a shiftable plunger within said control mechanism for directing dispatchment of fluid in at least two directions, means for enabling the shifting of said plunger by fluid power in at least one direction, a second plunger means within said control mechanism causing a modified fluid dispatchment in a direction selected by said first plunger, and fluid power means for controlling said second plunger means.

44. A control mechanism for fluid power circuits and the like adapted to be controlled in response to action of fluid power directed by said mechanism, a shiftable fluid directing plunger within said control mechanism for starting a fluid flow and reversing said flow, means associated with said directing plunger to cause a shifting of said plunger by fluid power in at least one direction, a second plunger means within said control mechanism for causing a variable fluid dispatchment in a direction selected by said first plunger, fluid power means for controlling said second plunger means, and means engageable for timingly controlling the shifting of at least one of said plungers under the influence of fluid power.

45. A control mechanism for fluid power circuits and the like adapted for automatic positioning in response to action of fluid power directed by said control mechanism, shiftable plunger means within said control mechanism for variously directing fluid power, and a self-contained fluid diverting control structure having a shiftable valve member for timingly determining the fluid flow through said control structure, and a diverting channel including a resiliently adjustable orifice means for controlling the amount of fluid diverted and for automatically compensating for a change in viscosity of the fluid diverted therethrough whereby to maintain a predetermined diverting pressure.

46. A control mechanism for fluid power circuits and the like adapted for automatic positioning in response to action of fluid power directed by said control mechanism, shiftable plunger means within said control mechanism for variously directing fluid power, a self-contained fluid diverting control structure having a shiftable valve member for timingly determining the fluid flow through said control structure, and a diverting channel including a resiliently adjustable orifice means for controlling the amount of fluid diverted and for automatically compensating for a change in viscosity of the fluid diverted therethrough whereby to maintain a predetermined diverting pressure, and an externally positioned abutment means adapted to automatically shift the valve member positioned in said fluid diverting structure.

47. The combination in a fluid transmission system for rotatably indexing a work supporting means and for causing an interlocked control action to a tool supporting member, a rotary work supporting member, a fluid actuator adapted to impart a rotation to said work supporting means in a step-by-step manner, fluid power generating means for propelling said fluid actuator, valve means for directing fluid from said fluid power generating means to said fluid actuator, including a valve plunger within a housing, a fluid actuated member associated with said tool supporting member adapted to initiate a valve structure, and an interlocking member associated with said work supporting fluid actuator to prevent any shifting of the fluid actuator member when the indexing of the work supporting member takes place, whereby an interlock is presented between the indexing and the initiation of said valve structure.

48. The combination in a fluid transmission system for rotatably indexing a work supporting means and for causing a control action to initiate the shifting of a tool supporting means, a rotary work supporting means, a fluid actuator for imparting a step-by-step indexing to said work supporting means, fluid power generating means for propelling said fluid actuator, a shiftable valve plunger within a housing for directing fluid from said fluid power generating means to said fluid actuator, a shiftable control member, and a fluid actuated member adapted to initiate the shifting of said tool supporting member by positioning said control member as an incident to the shifting of said fluid actuator to a predetermined position.

49. A control mechanism for fluid power circuits and the like adaptable to be controlled in response to action of fluid power directed by said mechanism, a shiftable fluid directing plunger within said control mechanism for initiating a fluid flow and for causing a reversal of said flow, a second shiftable plunger means for causing a variation in amount of the flow as initiated by said first fluid directing plunger, and externally positioned means adapted to automatically act upon one of said directing plungers for the purpose of shifting said plunger to cause a further variation in the amount of fluid flow in the initiated direction.

50. In a control mechanism for fluid power circuits and the like, adaptable to be controlled in response to action of fluid power directed by said mechanism, fluid directing means including a housed shiftable fluid directing plunger for initiating a fluid flow and for causing a reversal of said flow and fluid channels in said control mechanism for conveying said fluid, a second fluid directing means including a second housed shiftable plunger means and associated fluid channels in said control mechanism for conveying fluid power for shifting purposes to said plunger means, and a plurality of cam abutment means adapted to cause said fluid conveying plunger to shift in synchronism with the fluid flow whereby the amount of the fluid flow may be varied in accordance with various shifted positions of said second fluid plunger means as controlled by action of the fluid in the channels for conveying fluid power for shifting said second plunger means.

51. A control mechanism for fluid power circuits and the like, adaptable to be controlled in response to action of fluid power directed by said mechanism, a plurality of adjustable fluid power generating means, fluid directing means including a shiftable fluid directing plunger within said control mechanism for initiating fluid flow and for causing reversal of said flow and fluid channels within said control mechanism for directing said flow, a second fluid directing means including a second shiftable plunger means and associated fluid channels connected with said adjustable fluid power generating means, control fluid power channels whereby said first directing plunger serves as control element for dispatching shifting fluid to said second plunger means, and externally positioned cam abutment means for causing the shifting of one of said directing plungers to thereby automatically select the channel connected with a single or a plurality of said fluid power generating means.

52. In a fluid power generating structure, a unitary supporting frame including a fluid reservoir integral with said frame, a main drive shaft rotatably mounted in said supporting frame, a large delivery fluid pressure generating means driven by said drive shaft, a fluid channel between said reservoir and the intake of said large fluid pressure generating means, and a plurality of adjustable relatively small displacement fluid pressure generating means driven by said drive shaft and detachably supported by said supporting frame, whereby said small displacement fluid pressure generating means are removable without disturbing the driving means for said generating means.

53. In a fluid power generating structure, a unitary supporting frame including a fluid reservoir within said frame, a main drive shaft rotatably mounted in said supporting frame, a large delivery fluid power generating means driven by said drive shaft, a fluid channel between said reservoir and the intake of said large fluid pressure generating means, a plurality of relatively small displacement fluid power generating means driven by said drive shaft, and a unitary fluid control mechanism for dispatching fluid through a selected channel in said mechanism from a single or from all of said fluid power generating means.

54. In material working apparatus, a head frame, a rotary tool support, a plurality of material working elements supported by said head frame, said material working elements and rotary tool support being relatively shiftable radially with respect to said tool support, a work support, a hydraulic actuator for relatively moving said working elements and said work support axially with respect to said rotary tool support, a second hydraulic actuator for relatively moving said material working elements and said tool support, radially with respect to the axis of said tool support, and valve means for controlling the propelling of said hydraulic actuators.

55. In material working apparatus, a head frame, a rotary tool support, a plurality of material working elements supported by said head frame, said material working elements and rotary tool support being relatively shiftable radially with respect to the axis of said tool support, a work support, a hydraulic actuator for relatively moving said working elements and work support axially with respect to said rotary tool support, a second hydraulic actuator for relatively moving said material working elements and tool support radially with respect to the axis of said rotary tool support, and a fluid control mechanism for controlling the starting and rate of speed of said actuators and for selectively governing the direction of relative movement of said working elements and said work support.

56. In a fluid transmission system for machine tools and the like, a fluid power circuit including fluid pressure generating means therefor, control mechanism including a shiftable plunger within a housing for determining the starting and stopping of the fluid in said circuit, a plurality of actuators connectible with and shiftable in series by the fluid power in said circuit, a second fluid power circuit including adjustable fluid pressure generating means therefor, and a second shiftable plunger within said housing for causing said second circuit to function in response to action imparted by said first circuit.

57. In a fluid transmission system for machine tools and the like, a fluid power circuit including fluid pressure generating means therefor, control mechanism including a shiftable plunger within a housing for determining the starting and stopping of the fluid in said circuit, a plurality of actuators connectible with and shiftable in series by the fluid power in said circuit, a second fluid power circuit including adjustable fluid pressure generating means therefor, a second shiftable plunger within said housing for causing said second circuit to function in response to action imparted by said first circuit, and a fluid flow control mechanism associated with said second circuit for varying the flow in said circuit.

58. In a fluid transmission system for machine tools and the like, a fluid power circuit including fluid pressure generating means therefor, control mechanism including a shiftable plunger within a housing for determining the starting and stopping of the fluid in said circuit, a plurality of actuators connectible with and shiftable in series by the fluid power in said circuit, a second fluid power circuit including adjustable fluid pressure generating means therefor, a second shiftable plunger within said housing for causing said second circuit to function in response to action imparted by said first circuit, and a valve member associated with one of the said actuators to maintain the movement of said actuators in timed relationship with each other.

59. In a fluid transmission system for machine tools and the like, a fluid power circuit including a fluid pressure generating means therefor, a plurality of master actuating pistons propelled by said fluid power circuit, valve means for controlling the fluid delivery to said circuit, a plurality of fluid actuators propelled by the shifting of said master actuating pistons, and automatic control mechanism and synchronizing means associated with said master actuator pistons for causing an automatic cycle to be experienced.

60. In a fluid transmission system for machine tools and the like, a fluid power circuit including a fluid pressure generating means therefor, a plurality of master actuator pistons propelled by said fluid power circuit, a plurality of fluid actuators propelled by the shifting of said master actuating pistons, a second fluid power circuit including a variable delivery fluid power generating means for propelling said actuators at a variable speed, and valve means for controlling the circuits in timed relation with the shifting of said actuators.

61. In a metal working apparatus, a rotary supporting means, a transmission for delivering power to said supporting means, a plurality of hydraulic actuators shiftable relatively with respect to said rotary means, fluid power generating means for synchronously shifting said hydraulic actuators, a second variable fluid pressure generating means companion to each of said actuators for propelling each of said actuators at an independent rate of speed, valve means associated with one of said actuators to compensate for variation in travel, and a control mechanism for governing the effective propelling action imparted to said actuators and for controlling selection of either of said fluid pressure generating means to propel said actuators.

ERNEST J. SVENSON.